United States Patent
Hinchey et al.

(10) Patent No.: US 7,668,796 B2
(45) Date of Patent: Feb. 23, 2010

(54) AUTOMATA LEARNING ALGORITHMS AND PROCESSES FOR PROVIDING MORE COMPLETE SYSTEMS REQUIREMENTS SPECIFICATION BY SCENARIO GENERATION, CSP-BASED SYNTAX-ORIENTED MODEL CONSTRUCTION, AND R2D2C SYSTEM REQUIREMENTS TRANSFORMATION

(75) Inventors: Michael G. Hinchey, Bowie, MD (US); Tiziana Margaria, Dortmund (DE); James L. Rash, Davidsonville, MD (US); Christopher A. Rouff, Beltsville, MD (US); Bernard Steffen, Dortmund (DE)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 337 days.

(21) Appl. No.: 11/536,132

(22) Filed: Sep. 28, 2006

(65) Prior Publication Data

US 2007/0162410 A1 Jul. 12, 2007

Related U.S. Application Data

(60) Provisional application No. 60/757,559, filed on Jan. 6, 2006.

(51) Int. Cl.
*G06N 5/02* (2006.01)
*G06N 3/08* (2006.01)
(52) U.S. Cl. .......................................... 706/48; 717/100
(58) Field of Classification Search .................... 706/48
See application file for complete search history.

(56) References Cited

OTHER PUBLICATIONS

Püschel et al., "Spiral: A Generator for Platform-Adapted Libraries of Signal Processing Alogorithms", 2004.*

* cited by examiner

*Primary Examiner*—David R Vincent
*Assistant Examiner*—Nathan H Brown, Jr.
(74) *Attorney, Agent, or Firm*—Heather Goo

(57) ABSTRACT

Systems, methods and apparatus are provided through which in some embodiments, automata learning algorithms and techniques are implemented to generate a more complete set of scenarios for requirements based programming. More specifically, a CSP-based, syntax-oriented model construction, which requires the support of a theorem prover, is complemented by model extrapolation, via automata learning. This may support the systematic completion of the requirements, the nature of the requirement being partial, which provides focus on the most prominent scenarios. This may generalize requirement skeletons by extrapolation and may indicate by way of automatically generated traces where the requirement specification is too loose and additional information is required.

44 Claims, 27 Drawing Sheets

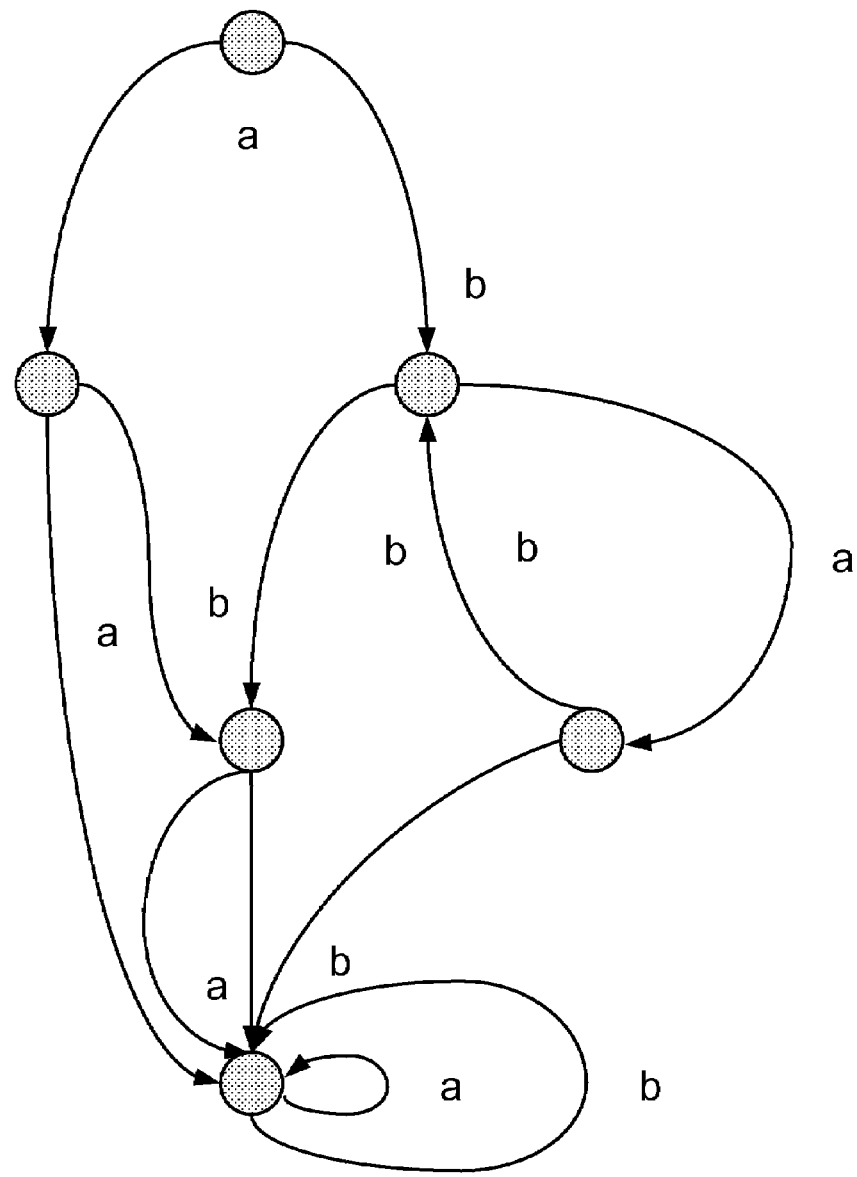
FIG. 15

AUTOMATA LEARNING ALGORITHMS AND PROCESSES FOR PROVIDING MORE COMPLETE SYSTEMS REQUIREMENTS SPECIFICATION BY SCENARIO GENERATION, CSP-BASED SYNTAX-ORIENTED MODEL CONSTRUCTION, AND R2D2C SYSTEM REQUIREMENTS TRANSFORMATION

RELATED APPLICATIONS

This application claims the benefit of U.S. Provisional Application Ser. No. 60/757,559, filed on Jan. 6, 2006.

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates generally to software development processes and more particularly to generating a system from scenarios.

BACKGROUND OF THE INVENTION

High dependability and reliability is a goal of all computer and software systems. Complex systems in general cannot attain high dependability without addressing crucial remaining open issues of software dependability. The need for ultra-high dependable systems increases continually, along with a corresponding increasing need to ensure correctness in system development.

The development of a system can begin with the development of a requirements specification, such as a formal specification or an informal specification. A formal specification might be encoded in a high-level language, whereas requirements in the form of an informal specification can be expressed in restricted natural language, "if-then" rules, graphical notations, English language, programming language representations, flowcharts, scenarios or even using semi-formal notations such as unified modeling language (UML) use cases.

Requirement specifications in terms of individual traces are by nature very partial and represent only the most prominent situations. This partiality is one of the major problems in requirement engineering. Partiality often causes errors in the system design that are difficult to fix. Thus, techniques to improve the partiality of requirements specifications are of major practical importance.

After completion of a requirements specification that represents domain knowledge, the system is developed. A formal specification may not necessarily be used by the developer in the development of a system. In the development of some systems, computer readable code is generated. The generated code can be encoded in a computer language, such as a high-level computer language. Examples of such languages include Java, C, C Language Integrated Production System (CLIPS), and Prolog.

In another aspect of conventional systems, sensor networks perform any number of different tasks, among them planetary and solar system exploration. An example of a sensor network for solar system exploration is the Autonomous Nano Technology Swarm mission (ANTS), which will send 1,000 pico-class (approximately 1 kg) spacecraft to explore the asteroid belt. The ANTS spacecraft acts as a sensor network making observations of asteroids and analyzing composition of the asteroids. Sensor networks are also applicable for planetary (e.g., Martian) exploration, to yield scientific information on weather and geology. For Earth exploration missions, sensor networks are applicable to early warnings about natural disasters and climate change.

NASA sensor networks can be highly distributed autonomous "systems of systems" that must operate with a high degree of reliability. The solar system and planetary exploration networks necessarily experience long communications delays with Earth. The exploration networks are partly and occasionally out of touch with the Earth and mission control for long periods of time, and must operate under extremes of dynamic environmental conditions. Due to the complexity of these systems as well as the distributed and parallel nature of the exploration networks, the exploration networks have an extremely large state space and are impossible to test completely using traditional testing techniques. The more "code" or instructions that can be generated automatically from a verifiably correct model, the less likely that human developers will introduce errors. In addition, the higher the level of abstraction that developers can work from, as is afforded through the use of scenarios to describe system behavior, the less likely that a mismatch will occur between requirements and implementation and the more likely that the system can be validated. Working from a higher level of abstraction also provides that errors in the system are more easily caught, since developers can more easily see the "big picture" of the system. Conventional systems also do not capture expert knowledge from natural language description through to low-level implementations, such as implementations in CLIPS, while maintaining correctness. In addition, conventional systems usually require other ways to validate procedures, for example from the Hubble Robotic Servicing Mission (HRSM), i.e. the procedures for replacement of cameras on the Hubble Space Telescope (HST). Furthermore, a test-based model generation by classical automata learning is very expensive, and requires an impractically large number of queries to the system, each of which must be implemented as a system-level test case. In particular trace-combination methods of testing have proven to be expensive.

For the reasons stated above, and for other reasons stated below which will become apparent to those skilled in the art upon reading and understanding the present specification, there is a need in the art to reduce partiality of system requirement specifications, reduce system development time, reduce the amount of testing required of a new system, and improve confidence that the system reflects the requirements. There is also a need to develop systems starting at higher levels of abstraction.

BRIEF DESCRIPTION OF THE INVENTION

The above-mentioned shortcomings, disadvantages and problems are addressed herein, which will be understood by reading and studying the following discussion.

In some embodiments, automata learning algorithms and techniques are implemented to generate a more complete set of scenarios for requirements based programming, which may solve the need in the prior art to reduce the partiality of system requirements.

In other embodiments, requirements expressed as a set of scenarios are generated and modified by automata learning processes and resources and the modified scenarios are converted to a process based description or other implementation. The automata learning processes may provide a more complete requirement specification which may solve the need in the prior art to reduce the partiality of system requirements.

In yet other embodiments, a CSP-based, syntax-oriented model construction, which requires the support of a theorem prover, is complemented by model extrapolation, via automata learning. This may support the systematic completion of the requirements, the nature of the requirement being partial, which provides focus on the most prominent scenarios. This may generalize requirement skeletons by extrapolation and may indicate by way of automatically generated traces where the requirement specification is too loose and additional information is required.

In still other embodiments, a R2D2C methodology is implemented to mechanically transform system requirements via provably equivalent models to executable computer code. In further embodiments, a CSP-based, syntax-oriented model construction of the R2D2C method is complemented with a learning-based method to provide requirements completion. Automatic (active) automata learning can systematically enriche requirement specifications posed in terms of traces.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 15 is a state diagram of a prefix closed deterministic finite state machine of membership query, according to an embodiment;

DETAILED DESCRIPTION OF THE INVENTION

In the following detailed description, reference is made to the accompanying drawings that form a part hereof, and in which is shown by way of illustration specific embodiments which can be practiced. These embodiments are described in sufficient detail to enable those skilled in the art to practice the embodiments, and it is to be understood that other embodiments can be utilized and that logical, mechanical, electrical and other changes can be made without departing from the scope of the embodiments. The following detailed description is, therefore, not to be taken in a limiting sense.

The detailed description is divided into six sections. In the first section, an embodiment of a system level overview is described. In the second section, embodiments of methods are described. In the third section, an embodiment of the hardware and the operating environment in conjunction with which embodiments can be practiced is described. In the fourth section, particular CSP implementations of embodiments are described. In the fifth section, particular apparatus embodiments are described. Finally, in the sixth section, a conclusion of the detailed description is provided.

System Level Overview

Figure 1:
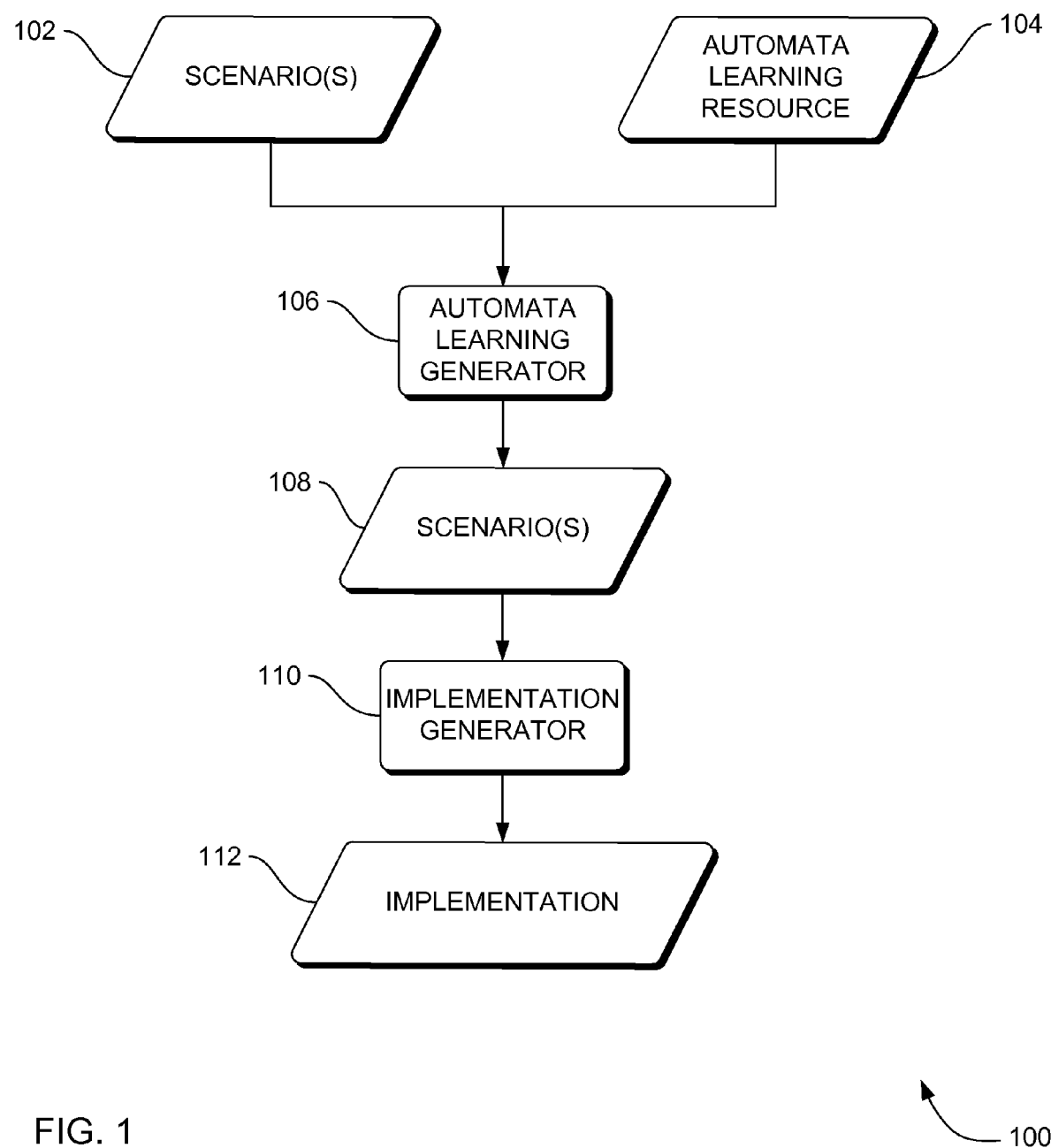
FIG. 1 is a block diagram that provides an overview of a system to generate an implementation of a software system from requirements of the system using automata learning, according to an embodiment.

FIG. 1 is a block diagram that provides an overview of a system 100 to generate an implementation of a software system from requirements of the system using automata learning, according to an embodiment. System 100 may produce a system by generating one or more scenarios that describe requirements of the system in reference to automata-learning resources and then generating implementations from the one or more scenarios. The automata learning processes may provide a more complete requirement specification, which may solve the need in the prior art to reduce the partiality of system requirements.

System 100 may include one or more scenarios 102 and one or more automata learning resource 104 that are input to or received by an automata learning generator 106. The automata learning resource 104 can represent a very broad category of automata software components that may include one or more functional software components such as dynamic link libraries, plug-in components, text files that describe functions, requirements details, configuration details, and/or executable programs to perform or direct automata learning processes.

The automata learning generator 106 may perform learning/searching functions to identify and remedy missing and/or incomplete aspects of the scenario(s) 102. The automata learning generator 106 can generate another set of one or more scenarios 108 that are more complete than scenarios(s) 102. The one or more scenarios 108 may be received by an implementation generator 110, which in turn may generate an implementation 112.

The scenarios 102 and 108 can be written in a particular syntax, such as constrained natural language, graphical representations, and so forth. The scenarios 102 and 108 can embody software applications, although one skilled in the art will recognize that other systems fall within the purview of this invention.

Method Embodiments

Figure 2:
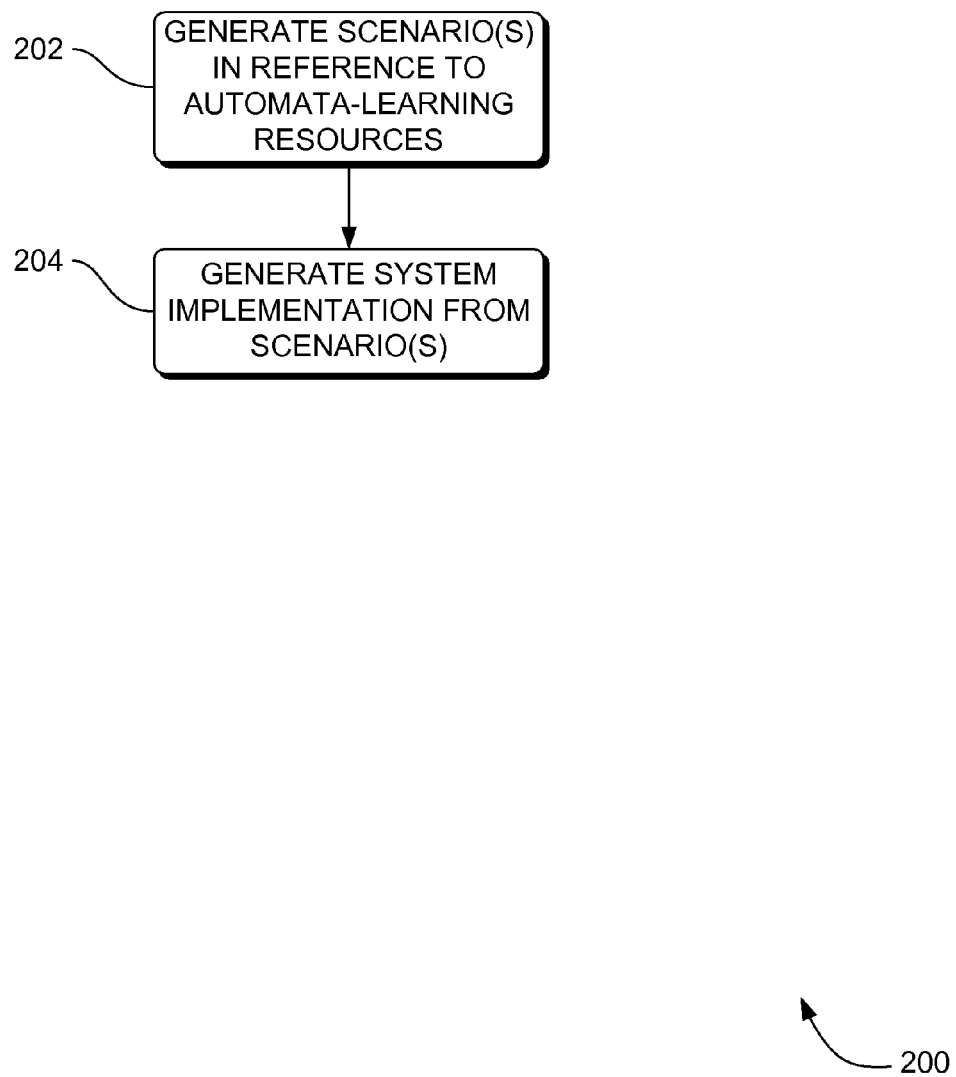
FIG. 2 is a flowchart of a method to generate a software system using automata learning techniques, according to an embodiment.

FIG. 2 is a flowchart of a method 200 to generate a software system using automata learning techniques, according to an embodiment. Method 200 may solve the need in the art to reduce the partiality of system requirements.

In some embodiments, method 200 may be performed by the automata learning generator 106 in FIG. 1.

Method 200 may include generating 202 at least one scenario 108 that describes requirements of the system in reference to automata-learning resources 104. One embodiment of action 202 is described in FIG. 3 below.

A scenario can be defined as a natural language text (or a combination of any, e.g. graphical, representations of sequential steps or events) that describes the software's actions in response to incoming data and the internal goals of the software. Some scenarios can also describe communication protocols between systems and between the components within the systems. Also, some scenarios can be known as UML use-cases. In some embodiments, a scenario may describe one or more potential executions of a system, describe what happens in a particular situation, and what range of behaviors is expected from or omitted by the system under various conditions.

Method 200 may also include generating 204 implementations from the at least one scenario. In at least one embodiment, generating 204 can be performed by pattern matching with set comprehensions without a theorem prover or a formal proof of correctness. The systems, methods and apparatus may include pattern-matching an equivalent formal model from informal specification. Such a model can be analyzed for contradictions, conflicts, use of resources before the resources are available, competition for resources, and so forth. From such a formal model, an implementation can be automatically generated in a variety of notations. An implementation may include traditional programming language code, machine language code, scripts, and/or procedures. The approach may improve the resulting implementation, which can be provably equivalent to the procedures described at the outset, which in turn can improve confidence that the system reflects the requirements, and in turn can reduce system development time and reduce the amount of testing required of a new system. Moreover, two or more implementations can be "reversed" to appropriate formal models, the models can be combined, and the resulting combination checked for conflicts. Then, the combined, error-free model can be used to generate a new (single) implementation that combines the functionality of the original separate implementations, and is more likely to be correct.

In regards to generating 202 at least one scenario 108 in automata learning, machine learning can automatically generate a description of a system. Automata learning can attempt to construct a deterministic finite automaton (see below) that matches the behavior of a given target automaton on the basis of observations of the target automaton and perhaps some further information on the internal structure of the target automaton.

One example of an automata learning algorithm may be Angluin's learning algorithm L*. L*, also referred to as an active learning algorithm, can learn a finite automaton actively posing membership queries and equivalence queries to that automaton in order to extract behavioral information, and refine successively a hypothesis automaton based on the answers. A membership query can test whether a string (a potential run) is contained in the target automaton's language (its set of runs), and an equivalence query can compare the hypothesis automaton with the target automaton for language equivalence in order to determine whether the learning procedure was (already) successfully completed and the experimentation can be terminated.

In basic form, L* can start with the one state hypothesis automaton that treats all words over the considered alphabet (of elementary observations) alike and can refine this automaton on the basis of query results iterating two steps. Here, the dual way of how L* characterizes (and distinguishes) states can be central:

* from below, by words reaching the states. This characterization may be too fine, as different words can lead to the same state.

* from above, by future behavior with respect to a dynamically increasing set of words. These future behaviors can be essentially bit vectors, where a '1' means that the corresponding word of the set is guaranteed to lead to an accepting state and a '0' captures the complement. This characterization can be too coarse, as the considered sets of words may typically be rather small.

The second characterization may directly define the hypothesis automata: each occurring bit vector corresponds to one state in the hypothesis automaton. The initial hypothesis automaton may be characterized by the outcome of the membership query for the empty observation. Thus, it can accept any word in case the empty word is in the language, and no state otherwise. The learning procedure can iteratively establish local consistency after which the learning procedure can check for global consistency.

In regards to local consistency, the first step (also referred to as automatic model completion) can again iterate two phases: one for checking whether the constructed automaton is closed under the one-step transitions, i.e., each transition from each state of the hypothesis automaton ends in a well defined state of this very automaton. And another phase for checking consistency according to the bit vectors characterizing the future behavior as explained above, i.e., whether all reaching words that have an identical characterization from above also possess the same one step transitions. If this is not the case, a distinguishing transition may be taken as an additional distinguishing future in order to resolve the inconsistency, i.e., the two reaching words with different transition potential may no longer be considered to represent the same state. For standard automata the characterization may be in terms of bit vectors. This may, however, not be required for the systems, method and apparatus disclosed herein, e.g. for Mealy machines the characterization can be in term of vectors of output sequences.

In regards to global equivalence, after local consistency has been established, an equivalence query can check whether the language of the hypothesis automaton coincides with the language of the target automaton. If this is true, the learning procedure may successfully terminate. Otherwise, the equivalence query may return a counterexample, i.e., a word which distinguishes the hypothesis and the target automaton. This counterexample may give rise to a new cycle of modifying the hypothesis automaton and starting the next iteration. In any practical attempt of learning legacy systems, equivalence tests can only be approximated, but membership queries can be often answered by testing.

Figure 3:
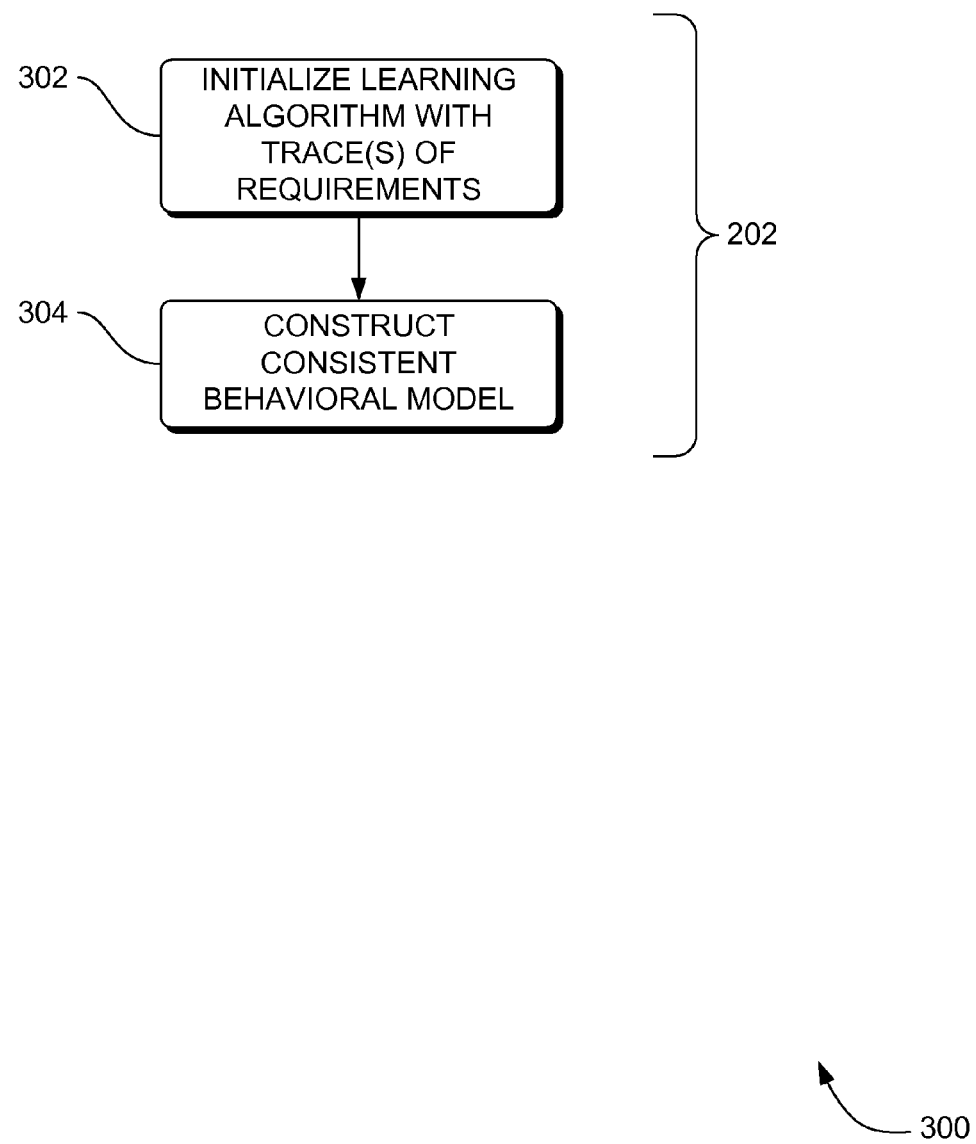
FIG. 3 is a flowchart of a method to generate a scenario using automata techniques, according to an embodiment.

FIG. 3 is a flowchart of a method 300 to generate a scenario using automata techniques, according to an embodiment. Method 300 is one embodiment of generating 202 at least one scenario that can describe requirements of the system in reference to automata-learning resources described above in FIG. 2. Method 300 may solve the need in the art to systematically complete partial system requirement specifications, which in turn reduces system development time, reduces the amount of testing required of a new system, and also improves confidence that the system reflects the requirements.

Method 300 may be a method for requirements completion, which can be based on automatic (active) automata learning. Method 300 may include initializing 302 a learning algorithm or other automata learning resource with a set of traces constituting the requirement specifications. The automata learning processes may provide a more complete requirement specification, which may solve the need in the prior art to reduce the partiality of system requirements.

Method 300 may include constructing 304 a consistent behavioral model by establishing a local consistency. Local consistency is discussed in detail above in conjunction with FIG. 1. Thus, a finite state behavioral model can be derived, which may be an extrapolation of the given requirement specification.

In some embodiments of method 300, a number of membership queries may be answered. Both establishing closure of the model, as well as establishing consistency of the abstraction of reaching words into states (i.e., of the characterization described above), can be effected on the basis of additional information about the intended/unknown system. For standard automata, the characterization may be in terms of bit vectors. This may, however, not be required for the systems, method and apparatus disclosed herein, e.g. for Mealy machines the characterization can be in term of vectors of output sequences. Deterministic finite state machines of membership queries are discussed in greater detail in FIGS. 15, 16 and 17 below.

Figure 4:
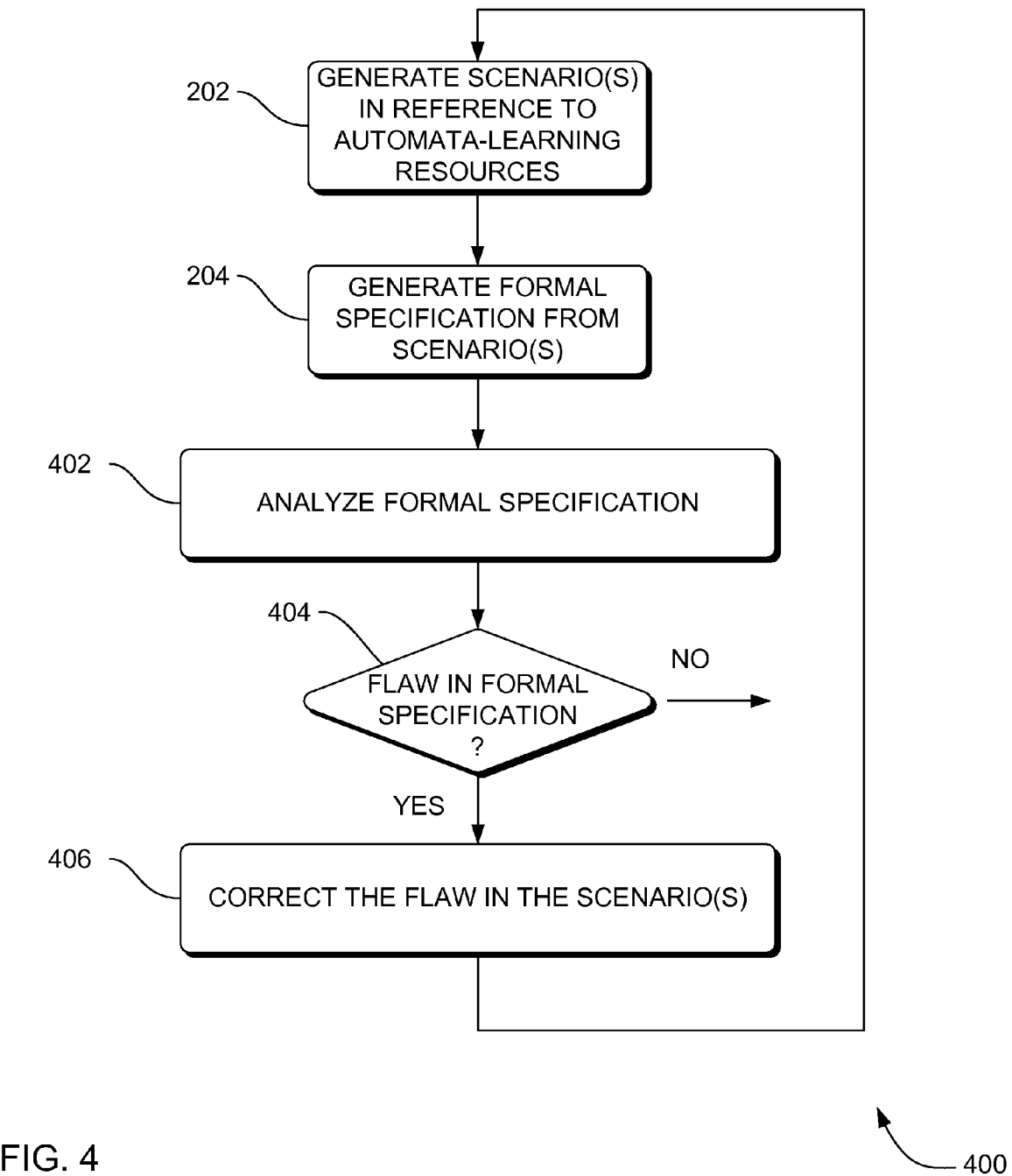
FIG. 4 is a flowchart of a method to validate/update a system, according to an embodiment.

FIG. 4 is a flowchart of a method 400 to validate/update a system, according to an embodiment. Method 400 may include generating 202 at least one scenario 108 that describes requirements of the system in reference to automata-learning resources 104 and generating 204 an implementation such as a formal specification from the at least one scenario.

Method 400 may also include analyzing 402 the formal specification.

Thereafter, a determination 404 can be made as to whether or not the analyzing 402 indicates that the formal specification contains a flaw. If a flaw does exist, then the scenario can be corrected 406 accordingly.

In some embodiments, the analyzing 402 can include applying mathematical logic to the formal specification in order to identify a presence or absence of mathematical properties of the formal specification. Mathematical properties of the formal specification that can be determined by applying mathematical logic to the formal specification can include, by way of example:

1) whether or not the formal specification implies a system execution trace that includes a deadlock condition, and 2) whether or not the formal specification implies a system execution trace that includes a livelock condition.

The above two properties can be domain independent. One skilled in the art will note that there are many other possible flaws that could be detected through the analysis of the model, many, or even most, of which might be domain dependent. An example of a domain dependent property would be represented by the operational principle that "closing a door that is not open is not a valid action." This example would be applicable in the domain of the Hubble Space Telescope on-orbit repair.

Because in some embodiments the formal specification can be provably equivalent to the scenario(s) by virtue of method 400, if a flaw is detected in the formal specification, the flaw could be corrected by changing (correcting) the scenario(s). Once the correction is made, then the corrected scenarios can be processed by system 200 in FIG. 2 or method 500 in FIG. 5 to derive a new formal specification from the corrected scenarios. According to at least one embodiment, the new formal specification can be processed by method 400, and the iterations of method 400 and method 500 can repeat until no more flaws exist in the formal specification generated from the scenarios, at which point the scenarios have no flaws because the formal specification can be provably equivalent to the scenarios from which the specification was derived. Thus, iterations of methods 400 and 500 can provide verification/validation of the scenarios.

Thereafter, the new formal specification can be used to generate an implementation of the system.

Figure 5:
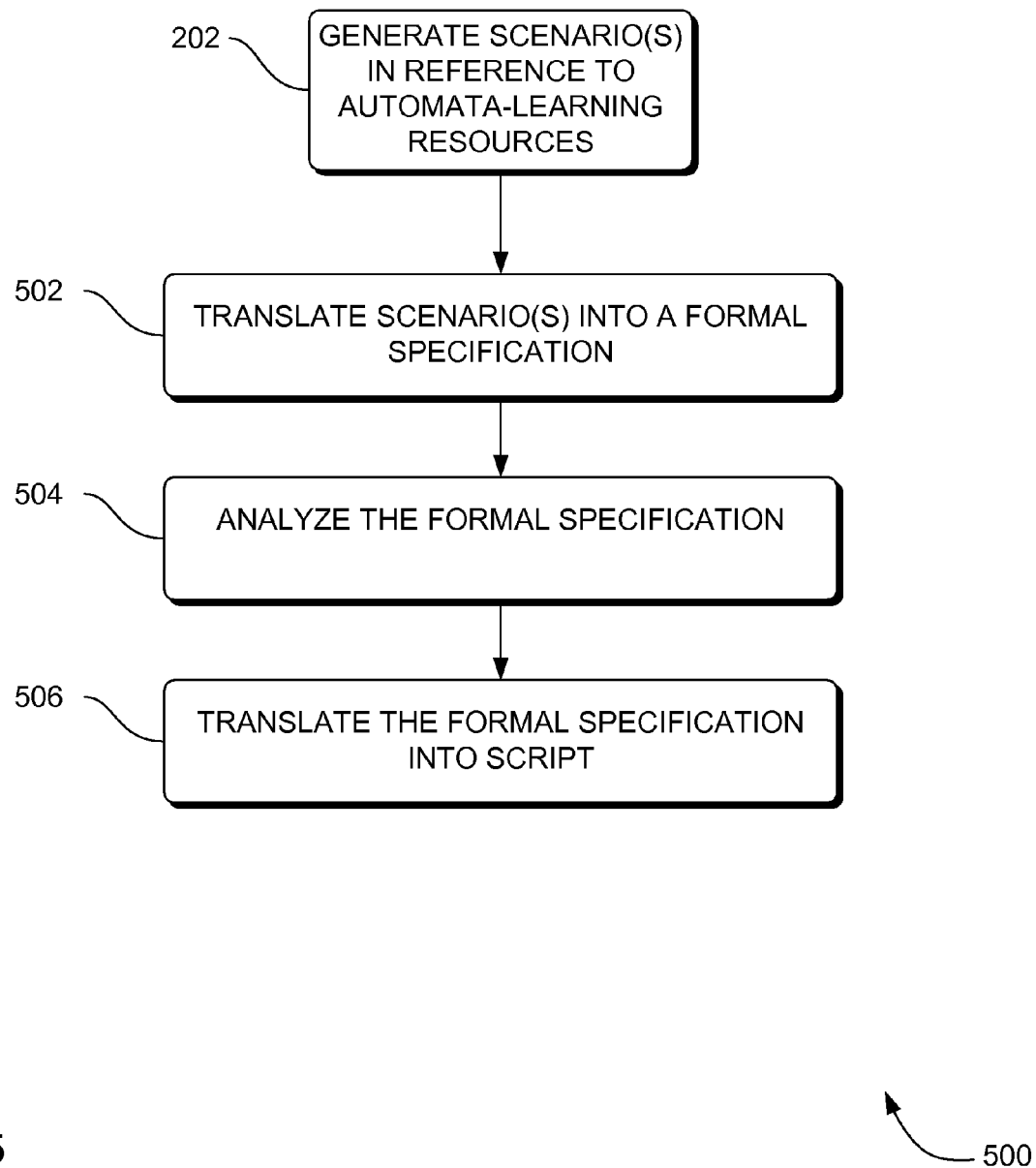
FIG. 5 is a flowchart of a method to validate/update scenarios of a system, according to an embodiment.

FIG. 5 is a flowchart of a method to validate/update scenarios of a system, according to an embodiment. Method 500 may include generating 202 at least one scenario 108 that describes requirements of the system in reference to automata-learning resources 104 and thereafter translating 502 scenarios 108 into a script without human intervention.

Thereafter, method 500 can include optionally analyzing 504 the formal model. The analyzing 504 can be a verification/validation of the scenarios 108. In some embodiments, the analyzing 504 determines various properties such as existence of omissions, deadlock, livelock, and race conditions in the script, although one skilled in the art will know that analyzing the formal model can determine other properties not specifically listed, which are contemplated by this invention. In some embodiments, the analyzing 504 can provide a mathematically sound analysis of the scenarios 108 in a general format that doesn't require significant understanding of the specific rules of the scenarios 108. Further, the analyzing 504 can warn developers of errors in the scenarios 108, such as contradictions and inconsistencies, but equally importantly the analyzing 504 can highlight rules or sets of rules that are underspecified or over-specified and need to be corrected for the scenarios 108 to operate as intended. Thus, no knowledge of the scenarios 108 may be required, but instead significant analysis, verification, testing, simulation and model checking of the scenarios 108 using customized tools or existing tools and techniques can be provided.

Thereafter, in some embodiments, method 500 can include translating 506 the formal specification to a script. Thus, in at least one embodiment, the method 500 may provide a method to convert scenarios to scripts without involvement from a computer programmer.

In method 500, informal representations of requirements for procedures/scripts that represent the operation of a system can be mechanically converted to a mathematically sound specification that can be analyzed for defects and used for various transformations, including automatic translation into executable form and automatic regeneration of procedures/scripts into other notations/representations. In other embodiments, the method disclosed herein can be used to automatically reverse engineer existing procedures and scripts to formal models from which the method can be used to produce customer-readable representations of procedures/scripts or machine-processable scripts in any of various scripting languages.

Mathematically sound techniques can be used to mechanically translate an informal procedure/script requirement into an equivalent formal model. The model can mechanically (that is, with no manual intervention) be manipulated, examined, analyzed, verified, and used in a simulation.

Figure 6:
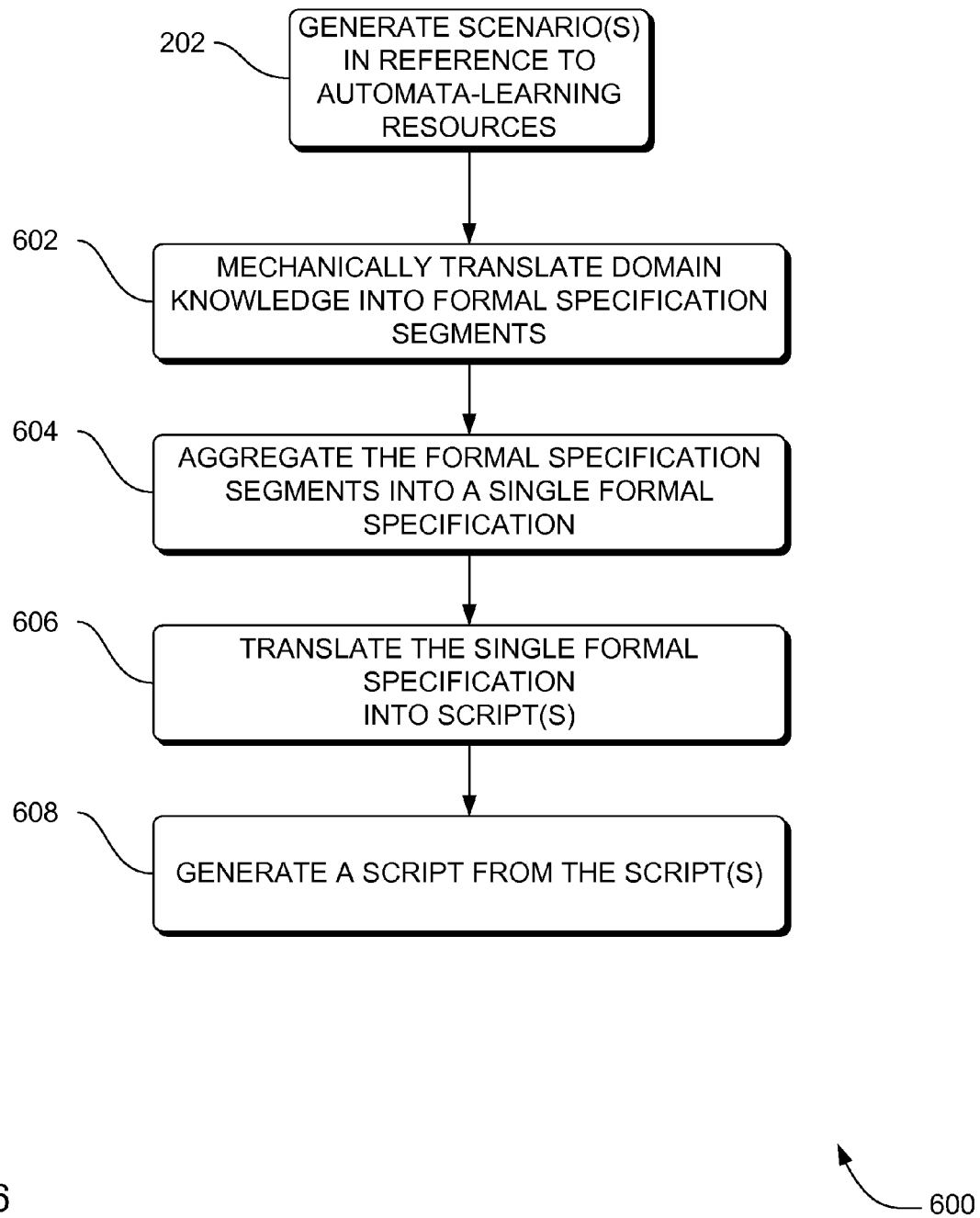
FIG. 6 is a flowchart of a method to generate a script from scenarios using automata learning, according to an embodiment.

FIG. 6 is a flowchart of a method 600 to generate a script from scenarios using automata learning, according to an embodiment. Method 600 can solve the need in the art to generate scripts from requirements with neither the time involved in manually writing the scripts, nor the mistakes that can arise in manually writing the scenarios. The automata learning processes implemented in method 600 may provide a more complete requirement specification, which may solve the need in the prior art to reduce the partiality of system requirements.

Method 600 may include generating 202 at least one scenario 108 that describes requirements of the system in reference to automata-learning resources 104 and thereafter mechanically translating 602 each of a plurality of scenarios to a plurality of formal specification segments. The translation can be done without human intervention. One embodiment of translating 602 is shown in FIG. 7 below.

Thereafter, method 600 can include aggregating 604 the plurality of formal specification segments into a single formal model.

Subsequently, method 600 can include translating 606 the single formal model to multiple scripts as output from translating 606. Thereafter, method 600 can include generating 608 a script from the scripts that were accepted from translating 606. Thus, method 600 can provide an embodiment of a method to convert a script to an application system without involvement from a computer programmer.

Figure 7:
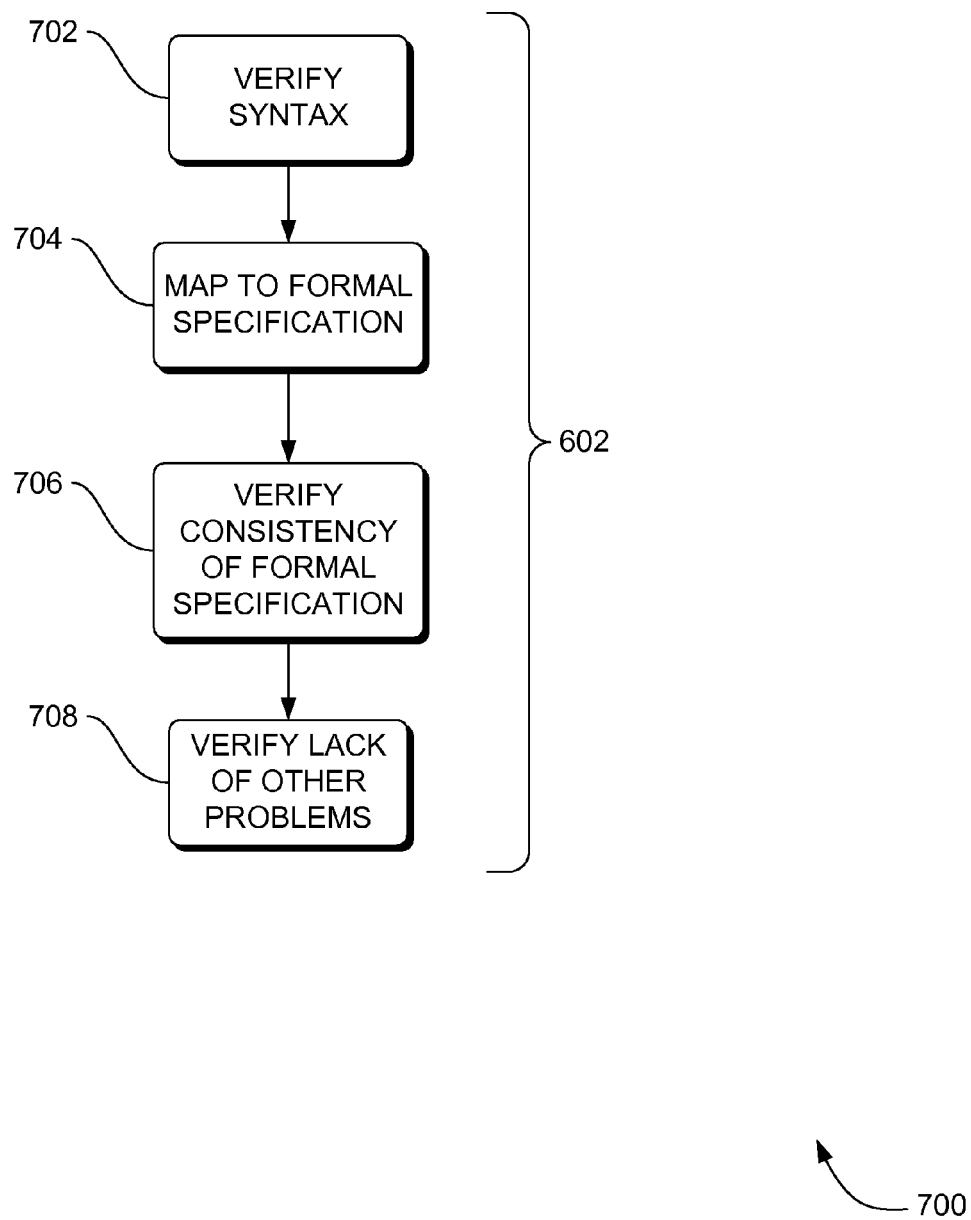
FIG. 7 is a flowchart of a method to mechanically translate each of a plurality of scenarios to a plurality of formal specification segments, according to an embodiment.

FIG. 7 is a flowchart of a method 700 to mechanically translate each of a plurality of scenarios to a plurality of formal specification segments, according to an embodiment. Method 700 is one embodiment of translating 602 in FIG. 6. As indicated, such translation can be accomplished without human intervention.

In some embodiments, the method 700 can include verifying 702 the syntax of the plurality of scenarios. Thereafter, method 700 can include mapping 704 the plurality of scenarios to a script.

In some embodiments, method 700 subsequently can also include verifying 706 consistency of the formal specification. In some embodiments, method 700 subsequently may also include verifying 708 a lack of other problems in the formal specification. One example of other problems could be unreachable states in the process defined in the formal specification, although one skilled in the art will understand that yet other problems are contemplated.

Figure 8:
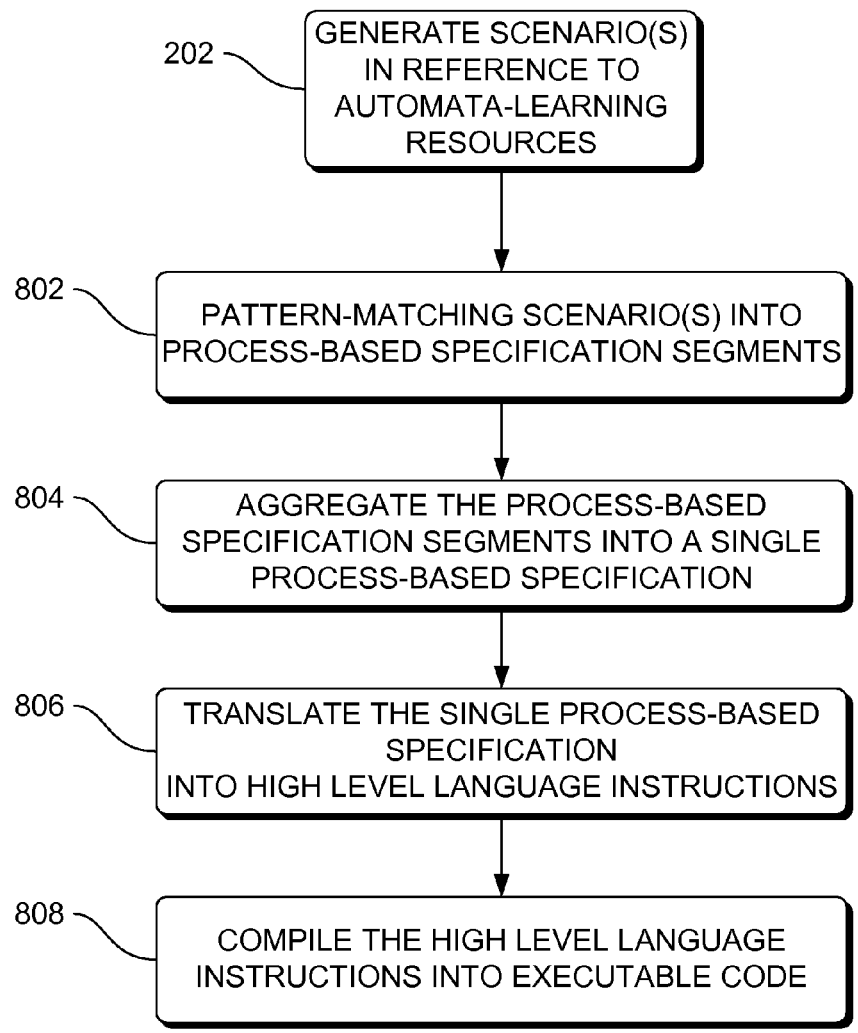
FIG. 8 is a flowchart of a method to generate an executable system from a scenario using automata learning, according to an embodiment.

FIG. 8 is a flowchart of a method 800 to generate an executable system from a scenario using automata learning, according to an embodiment. Method 800 may solve the need in the art to generate executable computer instructions from requirements with neither the time involved in manually writing the executable computer instructions, nor the mistakes that can arise therefrom. The automata learning processes may provide a more complete requirement specification which may solve the need in the prior art to reduce the partiality of system requirements.

Method 800 may include generating 202 at least one scenario 108 that describes requirements of the system in reference to automata-learning resources 104 and thereafter method 800 may include pattern-matching 802 mechanically each of a plurality of scenarios of the informal specification to a plurality of process-based specification segments. In some embodiments, the pattern-matching 802 may include inferring the process-based specification segments from the scenarios.

In some embodiments, the process-based specification can be process algebra notation. That embodiment may satisfy the need in the art for an automated, mathematics-based process for requirements validation that does not require large computational facilities.

Thereafter, method 800 may include aggregating 804 the plurality of process-based specification segments into a single process-based specification model.

Subsequently, method 800 may include translating 806 the single process-based specification model to instructions encoded in the Java computer language or some other high-level computer programming language. Thereafter, method 800 may include compiling 808 the instructions encoded in the Java computer language into a file of executable instructions.

In some embodiments, method 800 may include generating the executable instructions, which can provide a method to convert informal specifications to an application system without involvement from a computer programmer.

Figure 9:
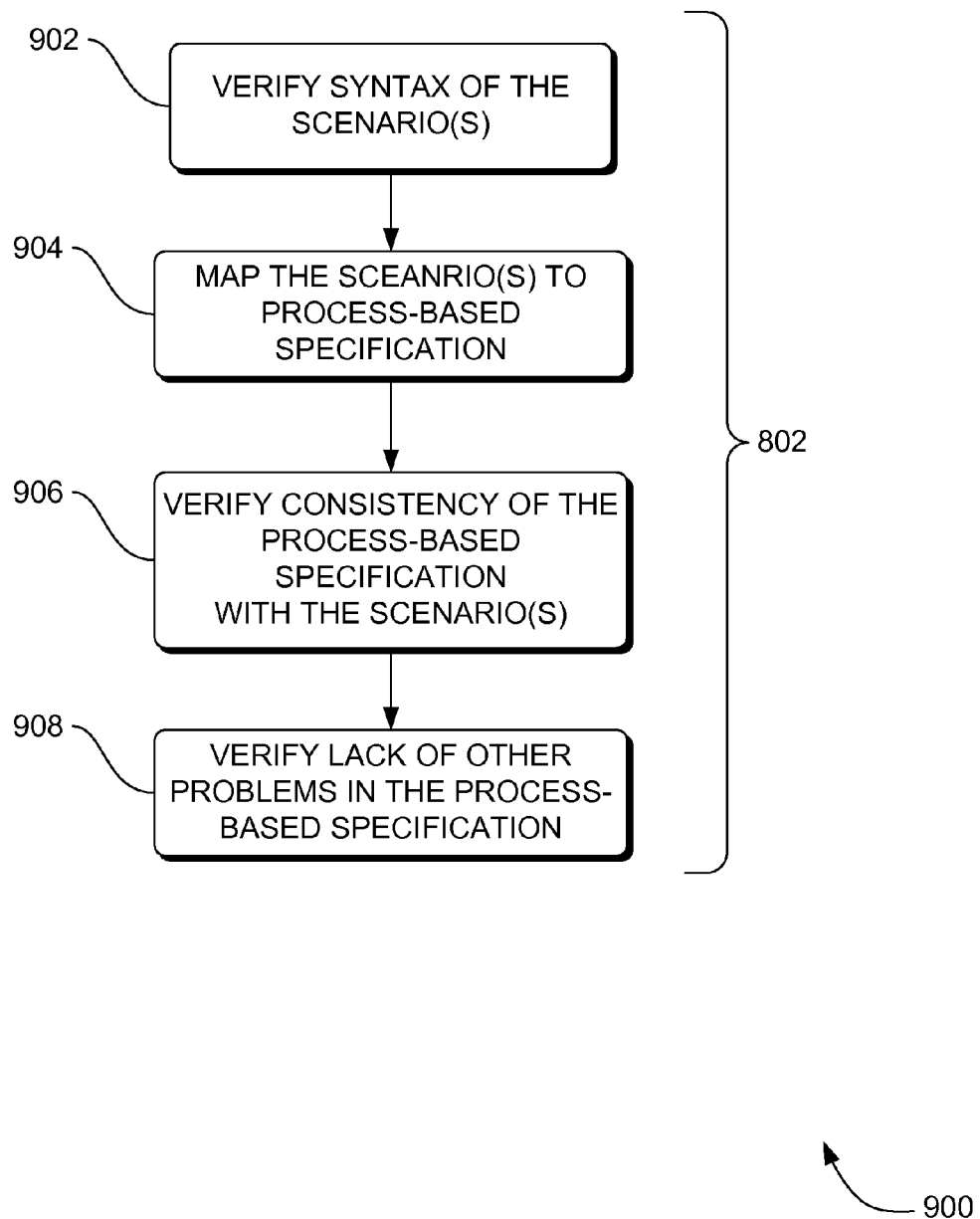
FIG. 9 is a flowchart of a method to translate mechanically each of a plurality of requirements of the scenario(s) to a plurality of process-based specification segments, according to an embodiment.

FIG. 9 is a flowchart of a method 900 to translate mechanically each of a plurality of requirements of the scenario(s) to a plurality of process-based specification segments, according to an embodiment. Method 900 is one embodiment of pattern-matching 802 in FIG. 8.

Method 900 may include verifying 902 the syntax of the scenario(s). Thereafter, method 900 may include mapping 904 the scenario(s) to a process-based specification.

In some embodiments, method 900 subsequently also may include verifying 906 consistency of the process-based specification with the scenario(s). In some embodiments, method 900 subsequently may also include verifying 908 a lack of other problems in the process-based specification. One example of other problems may be unreachable states in the process defined in the process-based specification.

Figure 10:
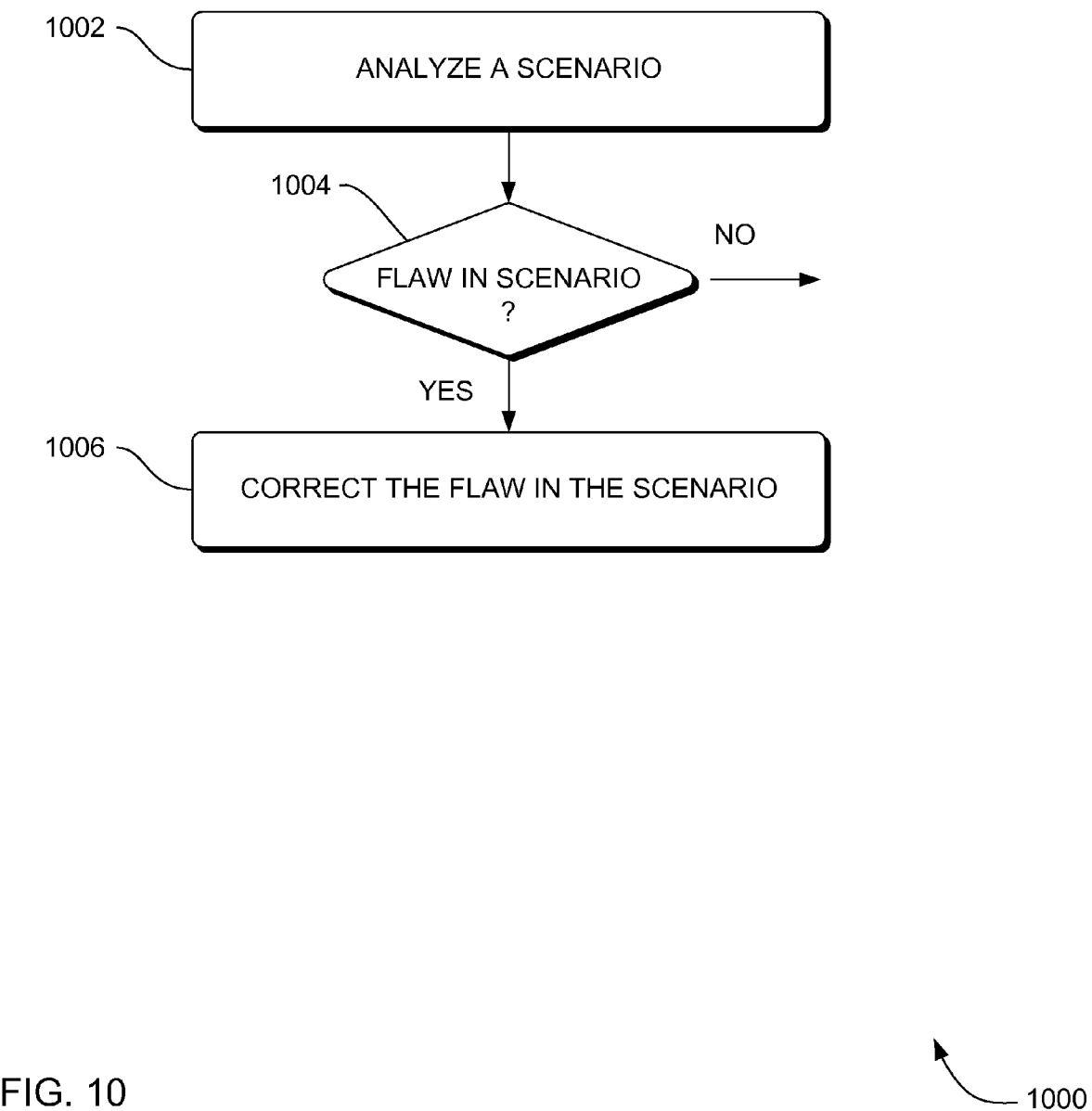
FIG. 10 is a flowchart of a method to recursively/heuristically validate/update a system, according to an embodiment.

FIG. 10 is a flowchart of a method 1000 to recursively/heuristically validate/update a system, according to an embodiment. Method 1000 may solve the need in the prior art to reduce errors in scenarios.

Method 1000 can include analyzing 1002 a scenario 102, of the system. In some embodiments, the analyzing 1002 can include applying mathematical logic to the scenario in order to identify a presence or absence of mathematical properties of the scenario. Mathematical properties of the scenario that can be determined by applying mathematical logic to the scenario can include, by way of example:

1) whether or not the scenario implies a system execution trace that includes a deadlock condition, and 2) whether or not the scenario implies a system execution trace that includes a livelock condition.

The above two properties can be domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example would be applicable in the domain of the Hubble Space Telescope on-orbit repair.

Thereafter, a determination 1004 can be made as to whether or not the analyzing 1002 indicates that the scenario contains a flaw. If a flaw does exist, then the scenarios can be corrected 1006 accordingly. Once the correction is made, then the corrected scenarios can be processed by implementation generator 110 in FIG. 1 or method 1100 in FIG. 11 to derive a new implementation from the corrected scenarios. According to at least one embodiment, the new scenario can be reprocessed by method 1000, and the iterations of method 1100 and method 1000 can repeat until there are no more flaws in the scenarios. Thus, iterations of methods 1100 and 1000 can provide verification/validation of the scenarios.

In some embodiments, method 1000 may be implemented by the automata learning generator 106 in FIG. 1 or as part of generating 202 at least one scenario 108 in FIG. 2, in which case method 1100 can generate at least one scenario in a recursive heuristic manner.

Figure 11:
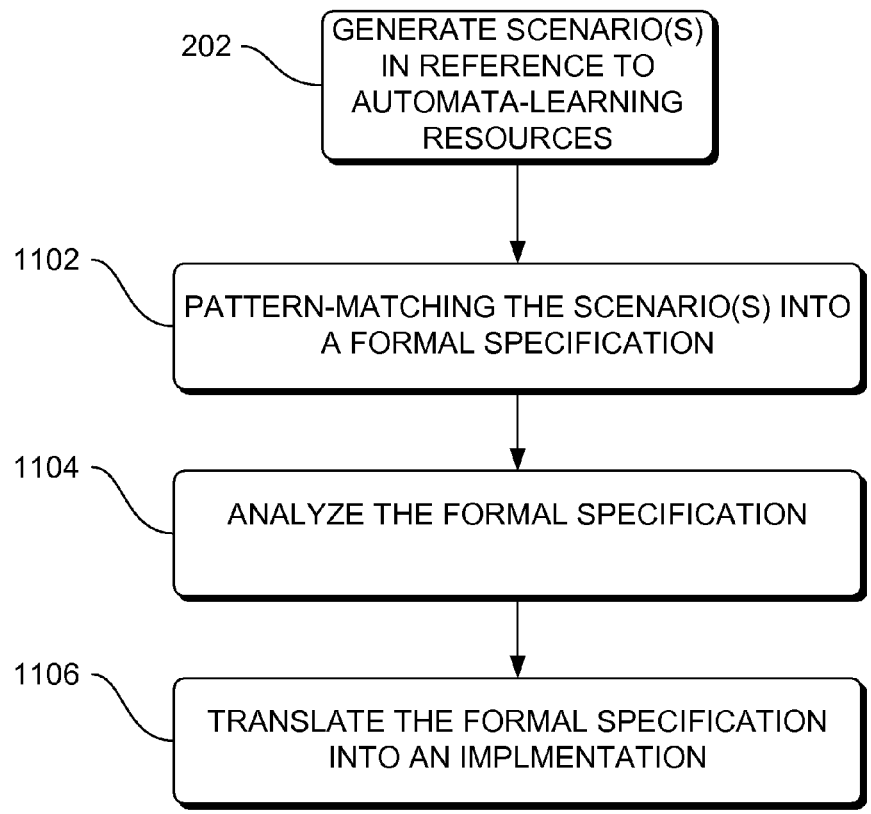
FIG. 11 is a flowchart of a method to pattern-match scenarios into a formal specification, analyze the formal specification, and translate the formal specification into an implementation, according to an embodiment.

FIG. 11 is a flowchart of a method to pattern-match scenarios into a formal specification, analyze the formal specification, and translate the formal specification into an implementation, according to an embodiment.

Method 1100 may include generating 202 at least one scenario 108 that describes requirements of the system in reference to automata-learning resources 104 and thereafter method 1100 may include pattern-matching 1102 scenario(s) 108 into a formal specification or model without human intervention. Thereafter, method 1100 can include analyzing 1104 the formal specification or model. The analyzing 1104 can be a verification/validation of the scenarios 108. In some embodiments, the analyzing 1104 may determine various properties such as existence of omissions, deadlock, livelock, and race conditions in the formal specification, although one skilled in the art will know that analyzing the formal model can determine other properties not specifically listed, which are contemplated in method 1100. In some embodiments, the analyzing 1104 can provide a mathematically sound analysis of the scenarios 108 in a general format that doesn't require significant understanding of the specific rules of the scenarios 108. Further, the analyzing 1104 can warn developers of errors in the scenarios 108, such as contradictions and inconsistencies, but equally importantly the analyzing 108 can highlight rules or sets of rules that are underspecified or over-specified and need to be corrected for the scenarios 108 to operate as intended. Thus, no knowledge of the scenarios 108 may be required, but instead significant analysis, verification, testing, simulation and model checking of the scenarios 108 using customized tools or existing tools and techniques may be provided.

Thereafter, in some embodiments, method 1100 can include translating 1106 the formal specification to an implementation 112. Thus, in at least one embodiment, the method 1100 can provide a method to convert scenarios to implementations without involvement from a computer programmer.

In method 1100, informal representations of requirements for implementations that represent the operation of a system can be mechanically converted to a mathematically sound specification that can be analyzed for defects and used for various transformations, including automatic translation into executable form and automatic regeneration of implementations into other notations/representations. In other embodiments, the method disclosed herein can be used to automatically reverse engineer existing implementations to formal models from which the method can be used to produce customer-readable representations of implementations or machine-processable implementations in any of various languages.

Mathematically sound techniques can be used to mechanically translate an informal scenario requirement into an equivalent formal model. The model can be mechanically (that is, with no manual intervention) manipulated, examined, analyzed, verified, and used in a simulation.

Figure 12:
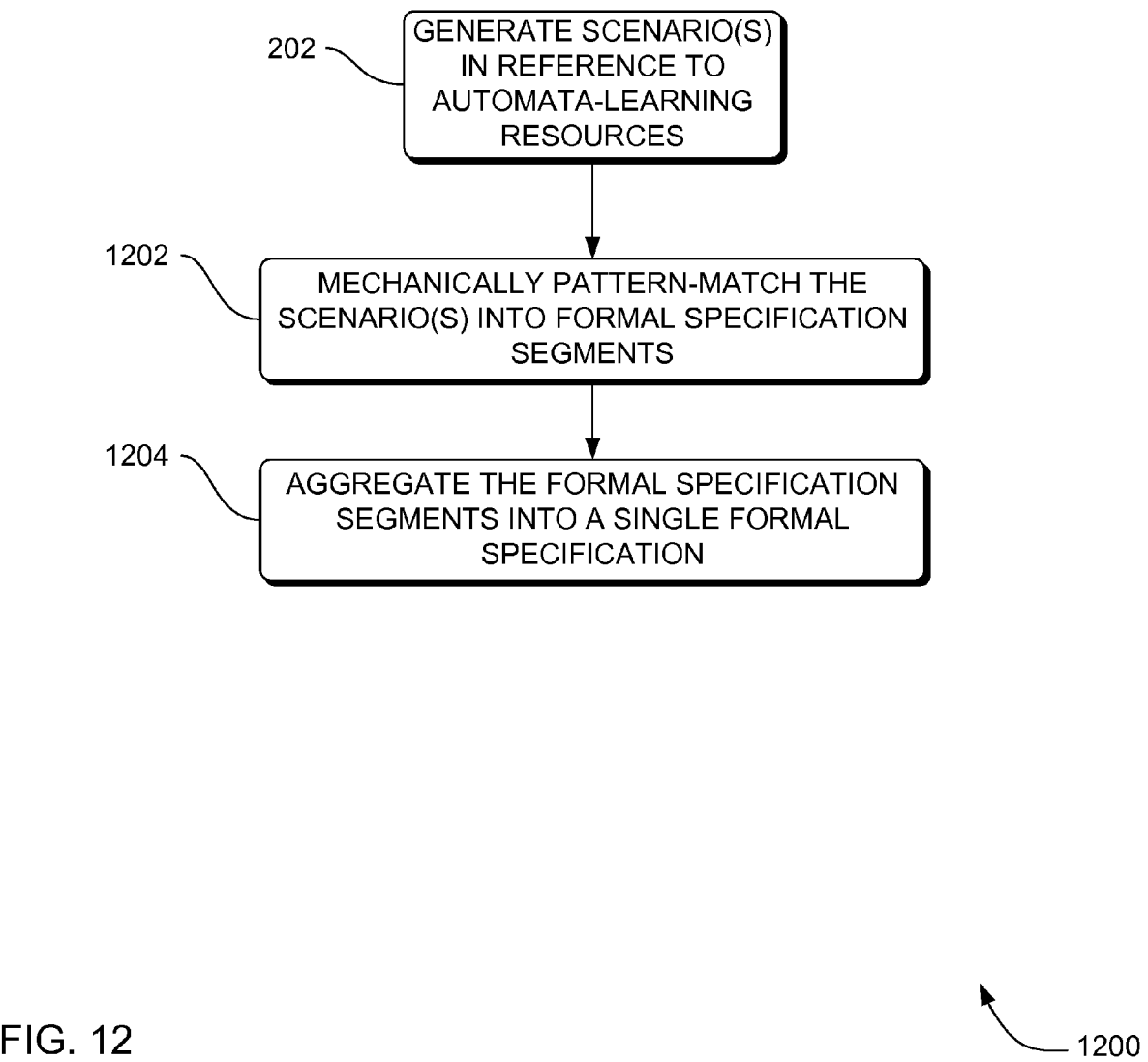
FIG. 12 is a flowchart of a method to generate a single formal specification from scenarios using automata learning, according to an embodiment.

FIG. 12 is a flowchart of a method 1200 to generate a single formal specification from scenarios using automata learning, according to an embodiment. Method 1200 can solve the need in the art to generate scenarios from requirements with neither the time involved in manually writing the scenarios, nor the mistakes that can arise in manually writing the scenarios.

Method 1200 may include generating 202 at least one scenario 108 that describes requirements of the system in reference to automata-learning resources 104, and thereafter method 1200 may include mechanically pattern-matching 1202 domain knowledge to a plurality of formal specification segments. The translation can be done without human intervention. One embodiment of pattern-matching 1202 is shown in FIG. 13 below.

Thereafter, method 1200 can include aggregating 1204 the plurality of formal specification segments into a single formal specification or model.

Figure 13:
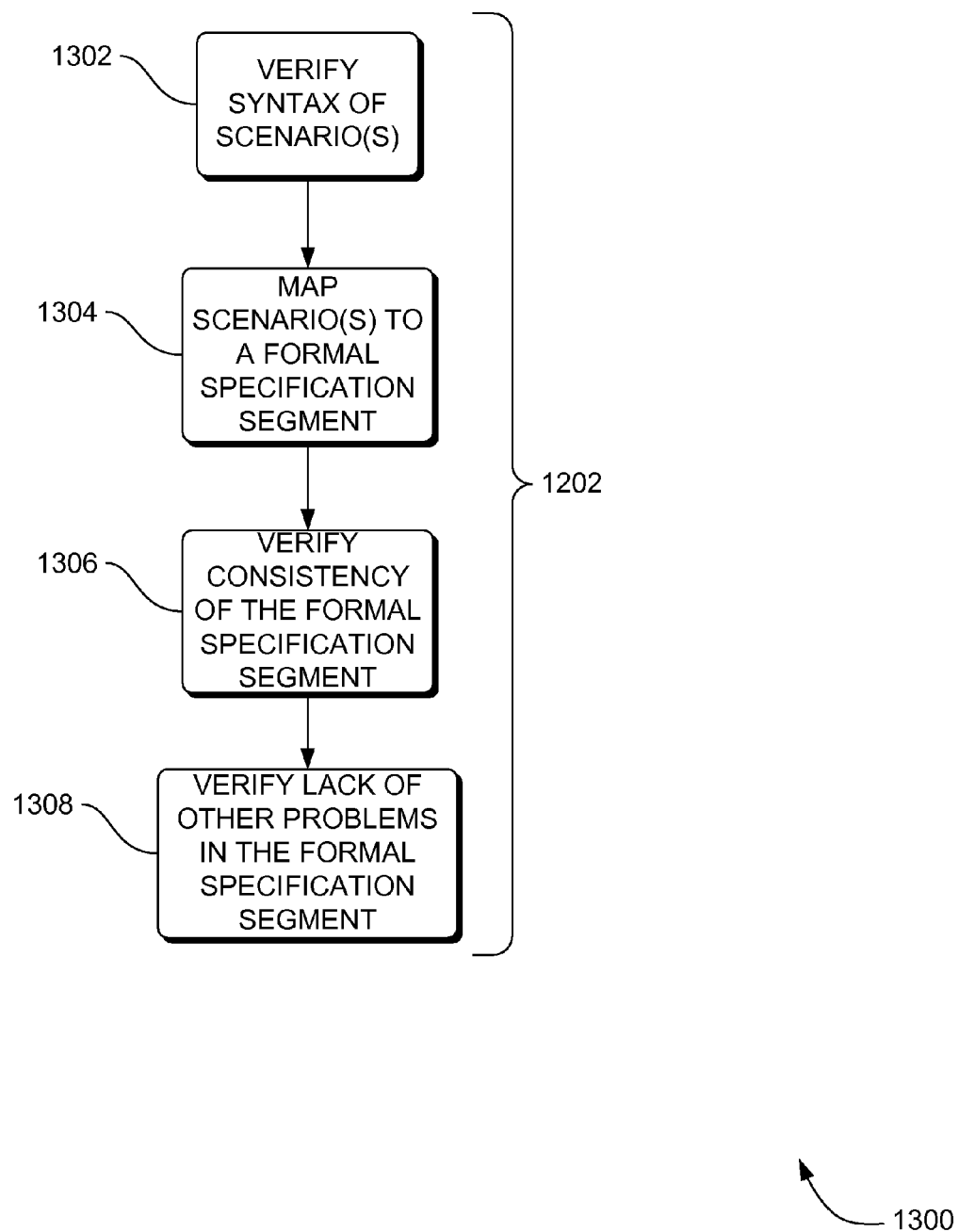
FIG. 13 is a flowchart of a method to mechanically pattern-match domain knowledge to a plurality of formal specification segments, according to an embodiment.

FIG. 13 is a flowchart of a method 1300 to mechanically pattern-match 1202 domain knowledge to a plurality of formal specification segments, according to an embodiment. Method 1300 is one embodiment of pattern-matching 1202 in FIG. 12. As indicated, such translation can be accomplished without human intervention.

In some embodiments, the method 1300 can include verifying 1302 the syntax of the one or more scenarios. Thereafter, method 1300 can include mapping 1304 the one or more scenarios to a formal specification.

In some embodiments, method 1300 subsequently can also include verifying 1306 consistency of the formal specification. In some embodiments, method 1300 can also subsequently include verifying 1308 a lack of other problems in the formal specification. One example of other problems can be unreachable states in the process defined in the formal specification, although one skilled in the art will understand that yet other problems are contemplated.

Figure 14:
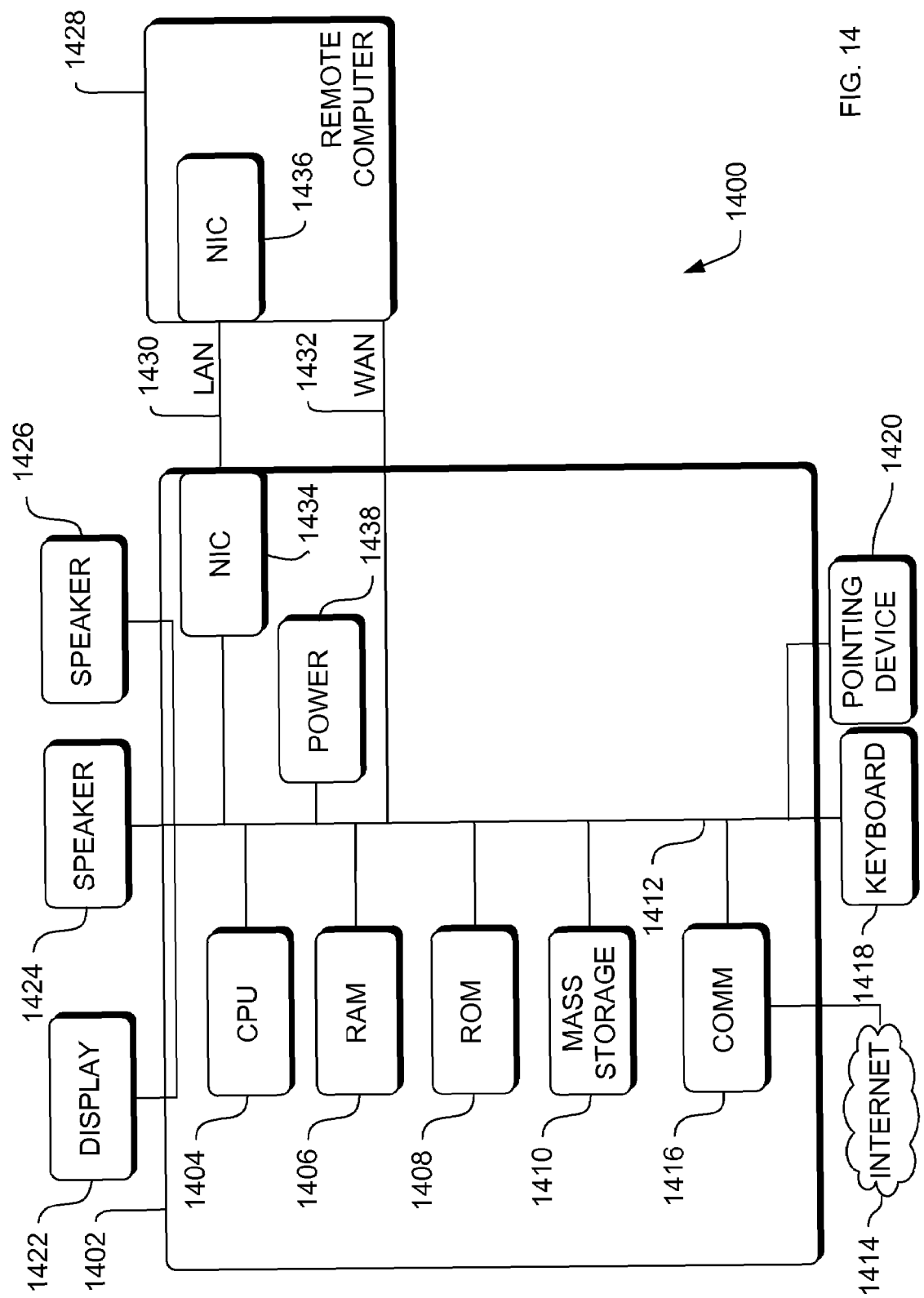
FIG. 14 is a block diagram of a hardware and operating environment in which different embodiments can be practiced.

In some embodiments, methods 200-1300 can be implemented as a computer data signal embodied in a carrier wave that represents a sequence of instructions, which, when executed by a processor, such as processor 1404 in FIG. 14, cause the processor to perform the respective method. In other embodiments, methods 200-1300 can be implemented as a computer-accessible medium having executable instructions capable of directing a processor, such as processor 1404 in FIG. 14, to perform the respective method. In varying embodiments, the medium can be a magnetic medium, an electronic medium, an electromagnetic medium, a medium involving configurations or spatial positioning of electrons, ions, atoms, or molecules or aggregations of such particles, a medium involving quantum mechanical entities, or an optical medium. Other mediums will be readily apparent to one skilled in the art and fall within the scope of this invention.

Hardware and Operating Environment

FIG. 14 is a block diagram of a hardware and operating environment 1400 in which different embodiments can be practiced. The description of FIG. 14 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment.

Computer 1402 may include a processor 1404, commercially available from Intel, Motorola, Cyrix and others. Computer 1402 may also include random-access memory (RAM) 1406, read-only memory (ROM) 1408, and one or more mass storage devices 1410, and a system bus 1412, that operatively couples various system components to the processing unit 1404. The memory 1406, 1408, and mass storage devices, 1410, can be types of computer-accessible media. Mass storage devices 1410 may be more specifically types of nonvolatile computer-accessible media and can include one or more hard disk drives, floppy disk drives, optical disk drives, and tape cartridge drives. The processor 1404 can execute computer programs stored on the computer-accessible media.

Computer 1402 can be communicatively connected to the Internet 1414 (or any communications network) via a communication device 1416. Internet 1414 connectivity is well known within the art. In one embodiment, a communication device 1416 may be a modem that responds to communication drivers to connect to the Internet via what is known in the art as a "dial-up connection." In another embodiment, a communication device 1416 may be an Ethernet® or similar hardware network card connected to a local-area network (LAN) that itself is connected to the Internet via what is known in the art as a "direct connection" (e.g., T1 line, etc.).

A user can enter commands and information into the computer 1402 through input devices such as a keyboard 1418 or a pointing device 1420. The keyboard 1418 may permit entry of textual information into computer 1402, as known within the art, and embodiments are not limited to any particular type of keyboard. Pointing device 1420 can permit the control of the screen pointer provided by a graphical user interface (GUI) of operating systems such as versions of Microsoft Windows®. Embodiments are not limited to any particular pointing device 1420. Such pointing devices may include mice, touch pads, trackballs, remote controls and point sticks. Other input devices (not shown) can include a microphone, joystick, game pad, gesture-recognition or expression recognition devices, or the like.

In some embodiments, computer 1402 may be operatively coupled to a display device 1422. Display device 1422 can be connected to the system bus 1412. Display device 1422 can permit the display of information, including computer, video and other information, for viewing by a user of the computer. Embodiments are not limited to any particular display device 1422. Such display devices may include cathode ray tube (CRT) displays (monitors), as well as flat panel displays such as liquid crystal displays (LCD's) or image and/or text projection systems or even holographic image generation devices. In addition to a monitor, computers typically can include other peripheral input/output devices such as printers (not shown). Speakers 1424 and 1426 (or other audio device) can provide audio output of signals. Speakers 1424 and 1426 may also be connected to the system bus 1412.

Computer 1402 may also include an operating system (not shown) that is stored on the computer-accessible media RAM 1406, ROM 1408, and mass storage device 1410, and is and executed by the processor 1404. Examples of operating systems may include Microsoft Windows®, Apple MacOS®, Linux®, UNIX®. Examples are not limited to any particular operating system, however, and the construction and use of such operating systems are well known within the art.

Embodiments of computer 1402 are not limited to any type of computer 1402. In varying embodiments, computer 1402 may comprise a PC-compatible computer, a MacOS®-compatible computer, a Linux®-compatible computer, or a UNIX®-compatible computer. The construction and operation of such computers are well known within the art.

Computer 1402 can be operated using at least one operating system to provide a graphical user interface (GUI), including a user-controllable pointer. Computer 1402 can have at least one web browser application program executing within at least one operating system, to permit users of computer 1402 to access an intranet, extranet or Internet world-wide-web pages as addressed by Universal Resource Locator (URL) addresses. Examples of browser application programs may include Netscape Navigator® and Microsoft Internet Explorer®.

The computer 1402 can operate in a networked environment using logical connections to one or more remote computers, such as remote computer 1428. These logical connections can be achieved by a communication device coupled to, or a part of, the computer 1402. Embodiments are not limited to a particular type of communications device. The remote computer 1428 can be another computer, a server, a router, a network PC, a client, a peer device or other common network node. The logical connections depicted in FIG. 14 can include a local-area network (LAN) 1430 and a wide-area network (WAN) 1432. Such networking environments are commonplace in offices, enterprise-wide computer networks, intranets, extranets and the Internet.

When used in a LAN-networking environment, the computer 1402 and remote computer 1428 can be connected to the local network 1430 through network interfaces or adapters 1434, which is one type of communications device 1416. Remote computer 1428 may also include a network device 1436. When used in a conventional WAN-networking environment, the computer 1402 and remote computer 1428 can communicate with a WAN 1432 through modems (not shown). The modem, which can be internal or external, may be connected to the system bus 1412. In a networked environment, program modules depicted relative to the computer 1402, or portions thereof, can be stored in the remote computer 1428.

Computer 1402 may also includes power supply 1438. Each power supply can be a battery.

Apparatus Embodiments

Figure 16:
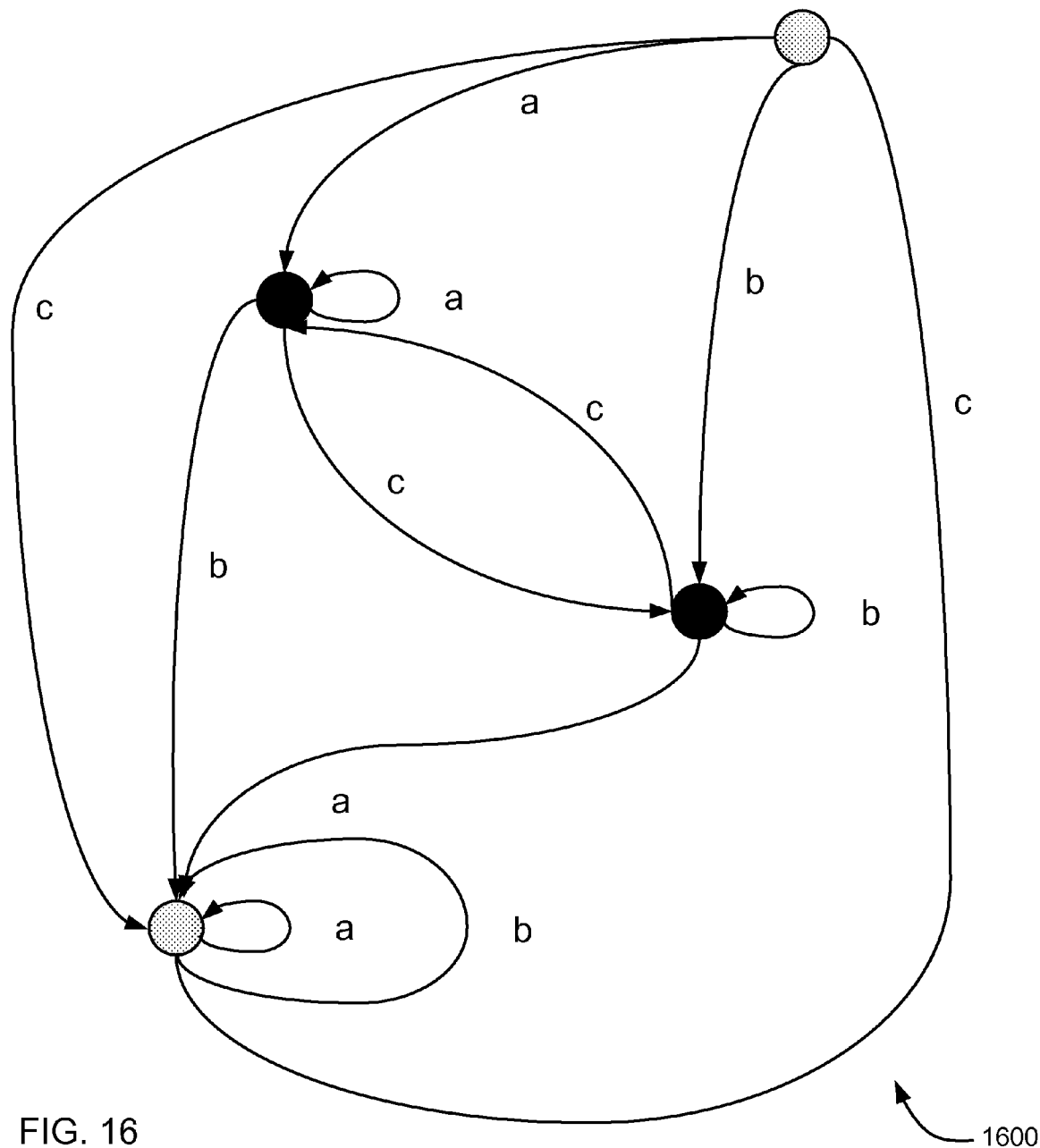
FIG. 16 is a state diagram of an independent action deterministic finite state machine of membership query, according to an embodiment.
Figure 17:
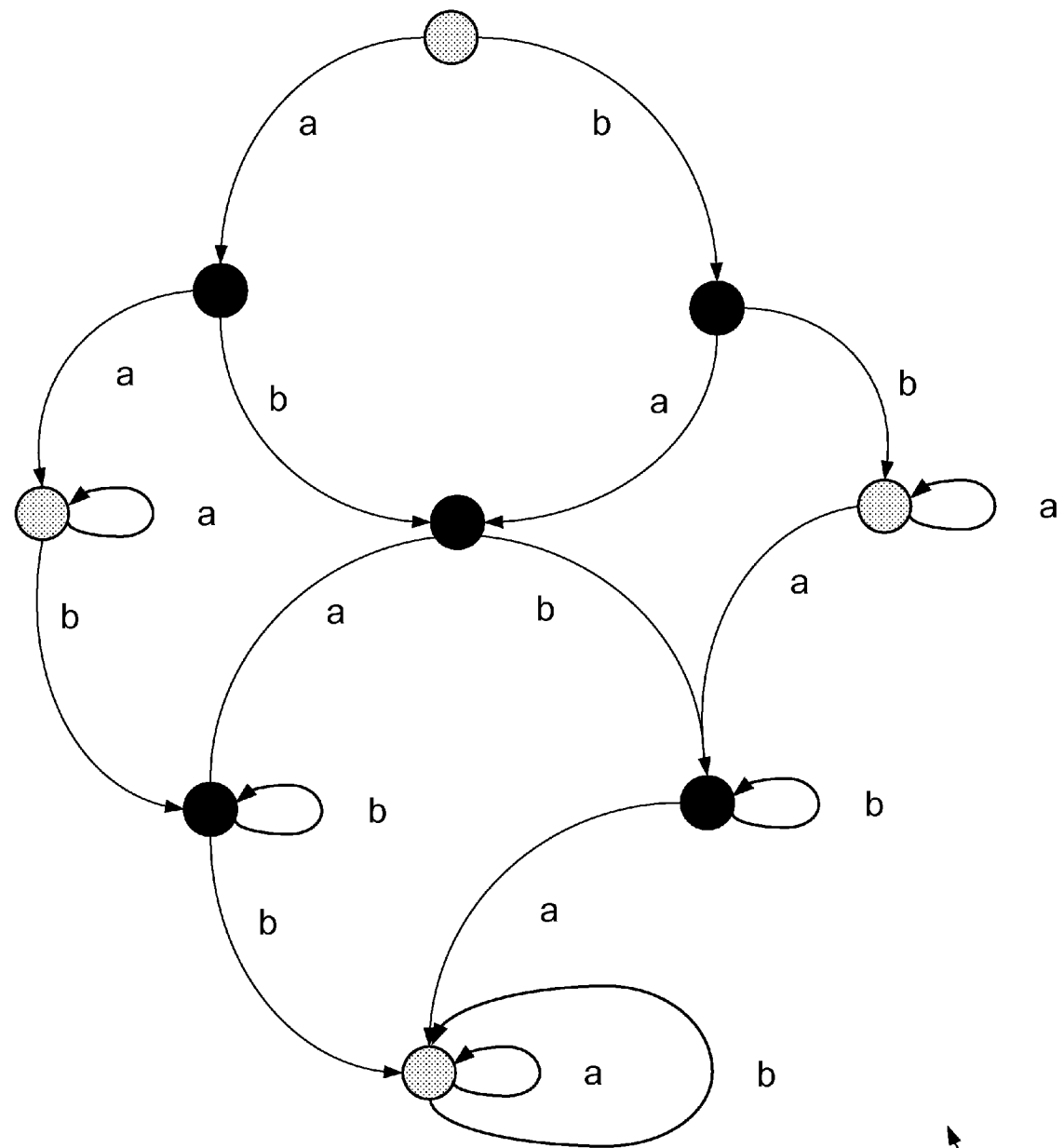
FIG. 17 is a state diagram of a symmetric action deterministic finite state machine of membership query, according to an embodiment.

FIGS. 15, 16 and 17 show deterministic finite state machines with different characteristics. In FIG. 15, 16 and 17, the top most state is illustrated as the start state of the diagram. In these figures, the gray portions can depict accepting states and the black portions can depict non-accepting states. In some embodiments of method 300 above, a number of membership queries can be answered. Both establishing closure of the model, as well as establishing consistency of the abstraction of reaching words into states (i.e., of the characterization described above), can be effected on the basis of additional information about the intended/unknown system. For standard automata the characterization can be made in terms of bit vectors. This is however not required for the systems, method and apparatus disclosed herein, e.g. for Mealy machines the characterization is in term of vectors of output sequences.

The posed membership queries may directly hint at the places where the given requirement specification is partial. However, numerous such membership queries can constitute a bottleneck of active learning, even in the case where the querying is fully automated. Thus, in some embodiments, the number of membership queries can be reduced on the basis of orthogonally given expert knowledge about the intended/unknown system. The following three very general structural criteria, prefix closure, independence of actions, and symmetry can be sufficient to reduce the number of membership queries by several orders of magnitude. By complementing these optimizations with filters for membership queries based on additional requirement specifications in terms of temporal properties, the required interaction can be reduced to a practical level.

FIG. 15 is a state diagram of a prefix closed deterministic finite state machine 1500 of membership query, according to an embodiment. A set of traces describing the potential runs of a reactive system can be by definition prefix-closed, because a run of a system can only be observed with all of its prefixes. This general observation can lead to savings in terms of membership queries.

FIG. 16 is a state diagram of independent actions deterministic finite state machine 1600 of membership query, according to an embodiment. Components of distributed systems can typically proceed independently to a large extent; a lot of the individual actions may not depend on each other and can therefore be executed in arbitrary order. This can provide completion of the inferred model by adding all admissible reshufflings. Depending on the nature of considered systems, this optimization can have a major impact.

FIG. 17 is a state diagram of a symmetric action deterministic finite state machine 1700 of membership query, according to an embodiment. Systems comprising sets of identical subsystems, like a set of identical storage cells, or a set of identical autonomous robots, can profit from a symbolic treatment of subsystems of the systems. The symbolic treatment may not work on the individuals, but on the particular roles played by some of the individuals during a particular execution trace; rather than speaking about an individual robot, the symbolic treatment may speak about the first robot starting to interact, or the third robot reaching a certain area. For systems with large sets of such identical subsystems, the symbolic treatment can turn out to be a must.

Temporal Requirement Specifications: Besides some typical example runs, application experts usually are also able to formulate many necessary safety conditions, on the basis of required protocols, or the exclusion of catastrophic states. By adding such safety requirements in terms of temporal logics to requirement specification, a large number of membership queries can be answered by use of model checking.

FIGS. 22-23 and 26-27 below describe how this technique is embedded into the R2D2C approach.

Figure 18:
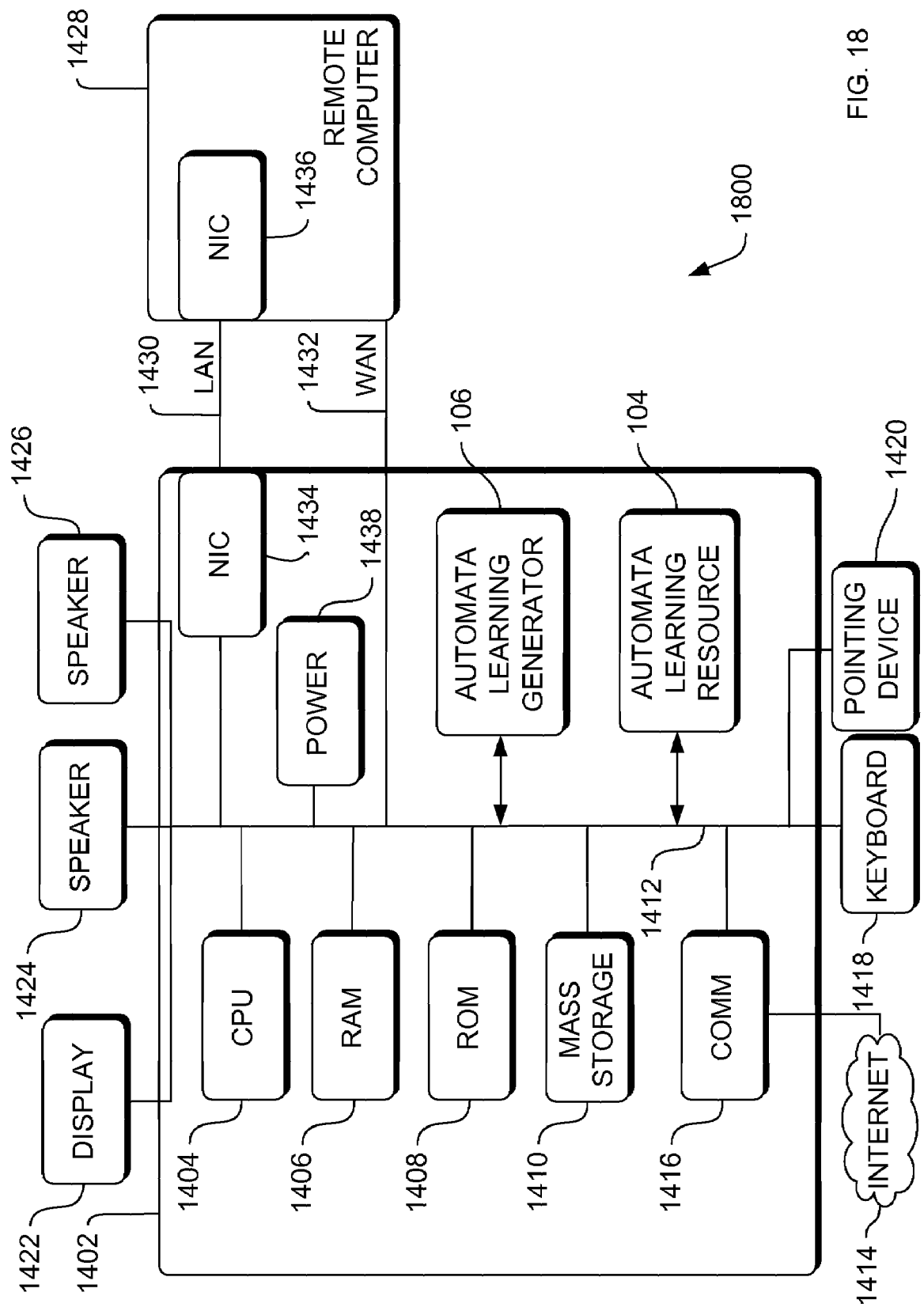
FIG. 18 illustrates an environment similar to that of FIG. 14, but with the addition of an automata learning resource, according to an embodiment.

FIG. 18 is a block diagram of an environment 1800 similar to that of FIG. 14, but with the addition of the automata learning resource 104 that may be input to, or received by, an automata learning generator 106, and that correspond to some components in system 100, according to an embodiment.

Figure 19:
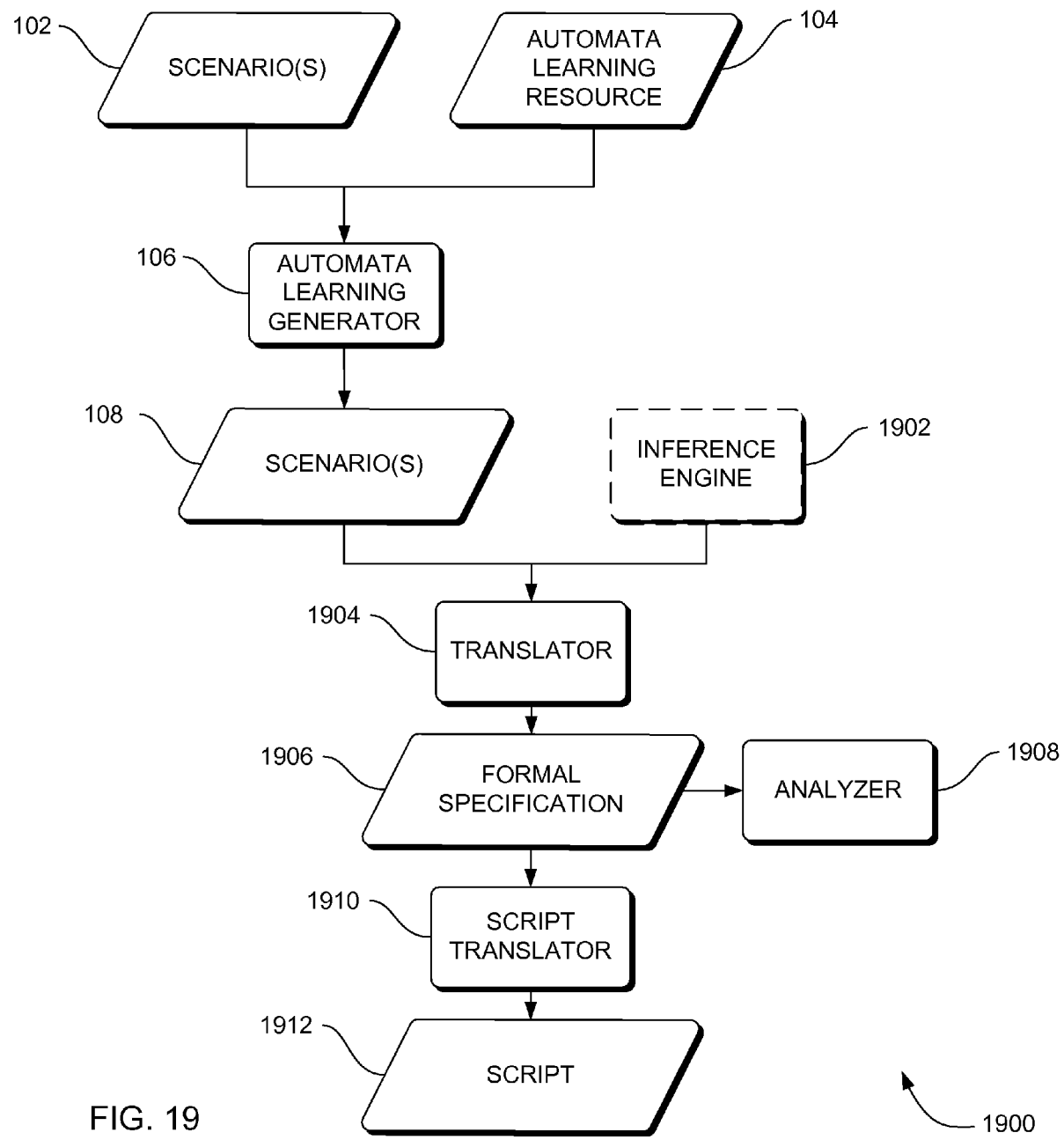
FIG. 19 is a block diagram of an apparatus to engineer a script or procedure from scenarios using an automata-learning generator, according to an embodiment.

FIG. 19 is a block diagram of an apparatus 1900 to engineer a script or procedure from scenarios using an automata-learning generator, according to an embodiment. Apparatus 1900 may solve the need in the art for an automated, generally applicable way to verify that an implemented script is a provably correct implementation of a set of scenarios.

One embodiment of the apparatus 1900 may be a software development system that includes a data flow and processing points for the data. According to the disclosed embodiments, apparatus 1900 can convert scenarios into a script on which model checking and other mathematics-based verifications can then be performed.

Apparatus 1900 may include one or more scenarios 102 and one or more automata learning resources 104 that may be input to or received by an automata learning generator 106. The automata learning generator 106 can generate another set of one or more scenarios 108.

In one embodiment, the scenarios 108 may be received by a translator 1904. The optional inference engine 1902 might be referenced by the translator 1904 when the scenarios 108 are translated by the translator 1904 into a formal specification 1906. Subsequently, the formal specification 1906 may be translated by script translator 1910 into a script 1912 in some appropriate scripting language. In some embodiments, no manual intervention in the translation is provided. Those skilled in the art will readily understand that other appropriate notations and/or languages exist that are within the scope of this invention.

In some embodiments, apparatus 1900 can include an analyzer 1908 to determine various properties of the formal specification, such as the existence of omissions, deadlock, livelock, and race conditions, as well as other conditions, in the formal specification 1906, although one skilled in the art will recognize that other additional properties can be determined by the analyzer 1908. The analyzer 1908 can solve the need in the prior art to reduce errors.

The terms "scripts" and "procedures" can be used interchangeably. Scripts can encompass not only instructions written in programming languages (such as Python, awk, etc., as described) but also in languages for physical (electromechanical) devices and even in constrained natural language instructions or steps or checklists to be carried out by human beings such as an astronaut.

Scripting languages are computer programming languages initially used only for simple, repeated actions. The name "scripting language" comes from a written script such as a screenplay, where dialog is repeated verbatim for every performance. Early script languages were often called batch languages or job control languages. A script is typically interpreted rather than compiled, but not always. Scripting languages are also known as scripting programming languages or script languages.

Many such languages are quite sophisticated and have been used to write elaborate programs, which are often still called scripts even though the applications of scripts are well beyond automating simple computer tasks. A script language can be found at almost every level of a computer system. Besides being found at the level of the operating system, scripting languages appear in computer games, web applications, word processing documents, network software and more. Scripting languages favor rapid development over efficiency of execution, scripting languages are often implemented with interpreters rather than compilers, and scripting languages are effective in communication with program components written in other languages.

Many scripting languages emerged as tools for executing one-off tasks, particularly in system administration. One way of looking at scripts is as "glue" that puts several components together; thus scripts are widely used for creating graphical user interfaces or executing a series of commands that might otherwise have to be entered interactively through keyboard at the command prompt. The operating system usually offers some type of scripting language by default, widely known as a shell script language.

Scripts are typically stored only in plain text form (as ASCII) and interpreted or compiled each time prior to being invoked.

Some scripting languages are designed for a specific domain, but often writing more general programs is possible in scripting languages that are designed for specific domains. In many large-scale projects, a scripting language and a lower level programming language are used together, each lending its particular strengths to solve specific problems. Scripting languages are often designed for interactive use, having many commands that can execute individually, and often have very high level operations (for example, in the classic UNIX shell (sh)), most operations are programs.

Such high level commands simplify the process of writing code. Programming features such as automatic memory management and bounds checking can be taken for granted. In a 'lower level' or non-scripting language, managing memory and variables and creating data structures tends to consume more programmer effort and lines of code to complete a given task. In some situations writing computer instructions in low level code is well worth the additional effort of the resulting fine-grained control. The scripter typically has less flexibility to optimize a program for speed or to conserve memory.

For the reasons noted above, programming in a scripting language is usually a faster process, and script files are typically much smaller than programs with equivalent functionality in conventional programming languages such as C.

Scripting languages generally fall into eight primary categories: Job control languages and shells, macro languages, application-specific languages, web programming languages, text processing languages, general-purpose dynamic languages, extension/embeddable languages, and extension/embeddable languages.

In regards to job control scripting languages and shells, a major class of scripting languages has grown out of the automation of job control—starting and controlling the behavior of system programs. Many of these languages' interpreters double as command-line interfaces, such as the Unix shell or the MS-DOS COMMAND.COM. Others, such as AppleScript, add scripting capability to computing environments lacking a command-line interface. Examples of job control scripting languages and shells include AppleScript, ARexx (Amiga Rexx), bash, csh, DCL, 4NT, JCL, ksh, MS-DOS batch, Windows PowerShell, REXX, sh, and Winbatch In regards to macro scripting languages, with the advent of graphical user interfaces came a specialized kind of scripting language for controlling a computer. These languages, usually called Macro languages, interact with the same graphic windows, menus, buttons and such that a person does. Macro language scripts are typically used to automate repetitive actions or configure a standard state. Macro language scripts can be used to control any application running on a GUI-based computer, but in practice the support for such languages depends on the application and operating system. Examples of macro scripting languages include AutoHotkey, AutoIt, and Expect.

In regards to application-specific scripting languages, many large application programs include an idiomatic scripting language tailored to the needs of the application user. Likewise, many computer game systems use a custom scripting language to express the programmed actions of non-player characters and the game environment. Languages of this sort are designed for a single application and, while application-specific scripting languages can superficially resemble a specific general-purpose language (e.g. QuakeC, modeled after C), application-specific scripting languages have custom features which distinguish the application-specific scripting languages. Examples of application-specific scripting languages include, Action Code Script, ActionScript, AutoLISP, BlobbieScript [1], Emacs Lisp, HyperTalk, IRC script, Lingo, Cana Embedded Language, mIRC script, NWscript, QuakeC, UnrealScript, Visual Basic for Applications, VBScript, and ZZT-oop.

In regards to web programming scripting languages, an important type of application-specific scripting language is one used to provide custom functionality to internet web pages. Web programming scripting languages are specialized for Internet communication and use web browsers as a user interface. However, most modern web programming scripting languages are powerful enough for general-purpose programming. Examples of web programming scripting language include ColdFusion (Application Server), Lasso, Miva, and SMX.

In regards to text processing scripting languages, the processing of text-based records is one of the oldest uses of scripting languages. Many text processing languages, such as awk and PERL, were originally designed to aid system administrators in automating tasks that involved Unix text-based configuration and log files. PERL is a special case—originally intended as a report-generation language, PERL has grown into a full-fledged applications language in its own right. Examples of text processing scripting languages include awk, PERL, sed and XSLT.

In regards to general-purpose dynamic scripting languages, some languages, such as PERL, began as scripting languages but developed into programming languages suitable for broader purposes. Other similar languages—frequently interpreted, memory-managed, and dynamic—have been described as "scripting languages" for these similarities, even if general-purpose dynamic scripting languages are more commonly used for applications programming. Examples of general-purpose dynamic scripting languages include APL, Dylan, Groovy, MUMPS (M), newLISP, PERL, PHP, Python, Ruby, Scheme, Smalltalk, SuperCard, and Tool command language (TCL). TCL was created as an extension language but has come to be used more frequently as a general purpose language in roles similar to Python, PERL, and Ruby.

In regards to extension/embeddable languages, a small number of languages have been designed for the purpose of replacing application-specific scripting languages, by being embeddable in application programs. The application programmer (working in C or another systems language) includes "hooks" where the scripting language can control the application. These languages serve the same purpose as application-specific extension languages, but with the advantage of allowing some transfer of skills from application to application. Examples of extension/embeddable script languages include Ch (C/C++ interpreter), ECMAScript a.k.a. DMDScript, JavaScript, JScript, GameMonkeyScript, Guile, ICI, Squirrel, Lua, TCT, and REALbasic Script (RBScript).

JavaScript began as and primarily still is a language for scripting inside of web browsers, however, the standardization of the language as ECMAScript has made JavaScript widely adopted as a general purpose embeddable language.

Other scripting languages include BeanShell (scripting for Java), CobolScript, Escapade (server side scripting), Euphoria, F-Script, Ferite, Groovy, Gui4Cli, To, KiXtart, Mondrian, Object REXX, Pike, Pliant, REBOL, ScriptBasic, Shorthand Language, Simkin, Sleep, StepTalk, and Visual DialogScript.

In some embodiments, the script 1912 can be mathematically and provably equivalent to the scenarios 108. Mathematically equivalent does not necessarily mean mathematically equal. Mathematical equivalence of A and B means that A implies B and B implies A. Note that the script 1912 of some embodiments is mathematically equivalent to, rather than necessarily equal to, the scenarios 108.

In some embodiments, the formal specification 1906 can be a process-based specification, such as process algebra encoded notation. The process algebra encoded notation can be a mathematically notated form. This embodiment can satisfy the need in the art for an automated, mathematics-based process for requirements validation that does not require large computational facilities.

In some embodiments, the scenarios 108 of apparatus 1900 can specify allowed situations, events and/or results of a software system. In that sense, the scenarios 108 can provide a very abstract specification of the software system.

Some embodiments of apparatus 1900 can be operational for a wide variety of rules, computer instructions, computer languages and applications; thus, apparatus 1900 may be characterized as generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the apparatus 1900 can provide mechanical or automatic generation of the script 1912, in which human intervention is not required. In at least one embodiment of the apparatus 1900, the generated application can be updated by changing the scenarios 108, in which case the changes and validation will ripple through the entire system without human intervention when apparatus 1900 operates. This also allows the possibility of cost effectively developing competing designs for a product and implementing each to determine the best one.

Thus, in regards to scripts and complex procedures, automatic code generation of apparatus 1900 can generate procedures/scripts in a suitable scripting language or device control language (such as for a robot) that would provide the procedures, once validated, to be automatically transformed into an implementation. Additionally, apparatus 1900 can be used to "reverse engineer" existing procedures/scripts so that the existing procedures/scripts can be analyzed and corrected and recast in a format and form that can be more easily understood. Apparatus 1900 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of apparatus 1900 can operate in a multi-processing, multi-threaded operating environment on a computer, such as the computer 1402 illustrated in FIG. 14. While the apparatus 1900 is not limited to any particular scenarios 108, inference engine 1902, translator 1904, formal specification 1906, analyzer 1908, script translator 1910 and script 1912, for sake of clarity, embodiments of simplified scenarios 108, inference engine 1902, translator 1904, formal specification 1906, analyzer 1908, script translator 1910 and script 1912 are described.

In some embodiments, the apparatus 1900 may be a software development system that can include a data flow and processing points for the data. Apparatus 1900 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, apparatus 1900 can, without human intervention, convert different types of specifications (such as natural language scenarios or descriptions which are effectively pre-processed scenarios) into process-based scripts on which model checking and other mathematics-based verifications are performed, and then optionally convert the script into code.

Apparatus 1900 can be operational for a wide variety of languages for expressing requirements, thus apparatus 1900 may be characterized as generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a scenario can be natural language text (or a combination of any, such as possibly graphical, representations of sequential steps or events) that describes the software's actions in response to incoming data and the internal goals of the software. Scenarios also can describe communication protocols between systems and between the components within the systems. Scenarios also can be known as use cases. A scenario can describe one or more potential executions of a system, such as describing what happens in a particular situation and what range of behaviors is expected from or omitted by the system under various conditions.

Natural language scenarios can be constructed in terms of individual scenarios written in a structured natural language. Different scenarios can be written by different stakeholders of the system, corresponding to the different views the stakeholders can have of how the system will perform, including alternative views corresponding to higher or lower levels of abstraction. Natural language scenarios can be generated by a user with or without mechanical or computer aid. Such a set of natural language scenarios can provide the descriptions of actions that occur as the software executes. Some of these actions can be explicit and required, while others can be due to errors arising or as a result of adapting to changing conditions as the system executes.

For example, if the system involves commanding space satellites, scenarios for that system can include sending commands to the satellites and processing data received in response to the commands. Natural language scenarios, in some embodiments, would be specific to the technology or application domain to which the natural language scenarios are applied. A fully automated general purpose approach covering all domains may be technically prohibitive to implement in a way that is both complete and consistent.

To ensure consistency, the domain of application can often be purpose-specific. For example, scenarios for satellite systems can not be applicable as scenarios for systems that manufacture agricultural chemicals.

Script Implementation

Figure 20:
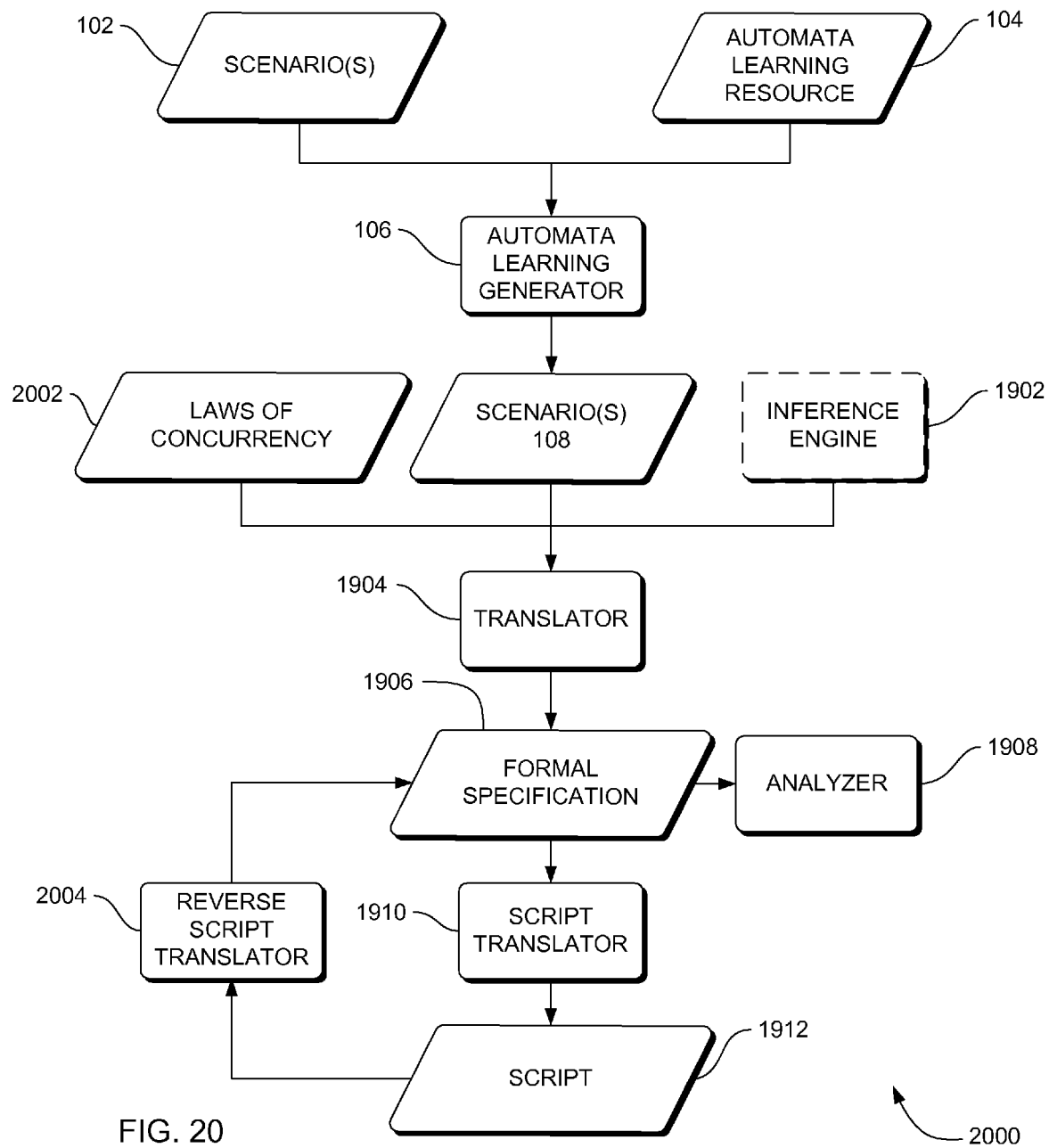
FIG. 20 is a block diagram of a particular implementation of an apparatus to translate scenarios to a script and reverse engineer a script into a formal specification using an automata-learning generator, according to an embodiment.
Figure 21:
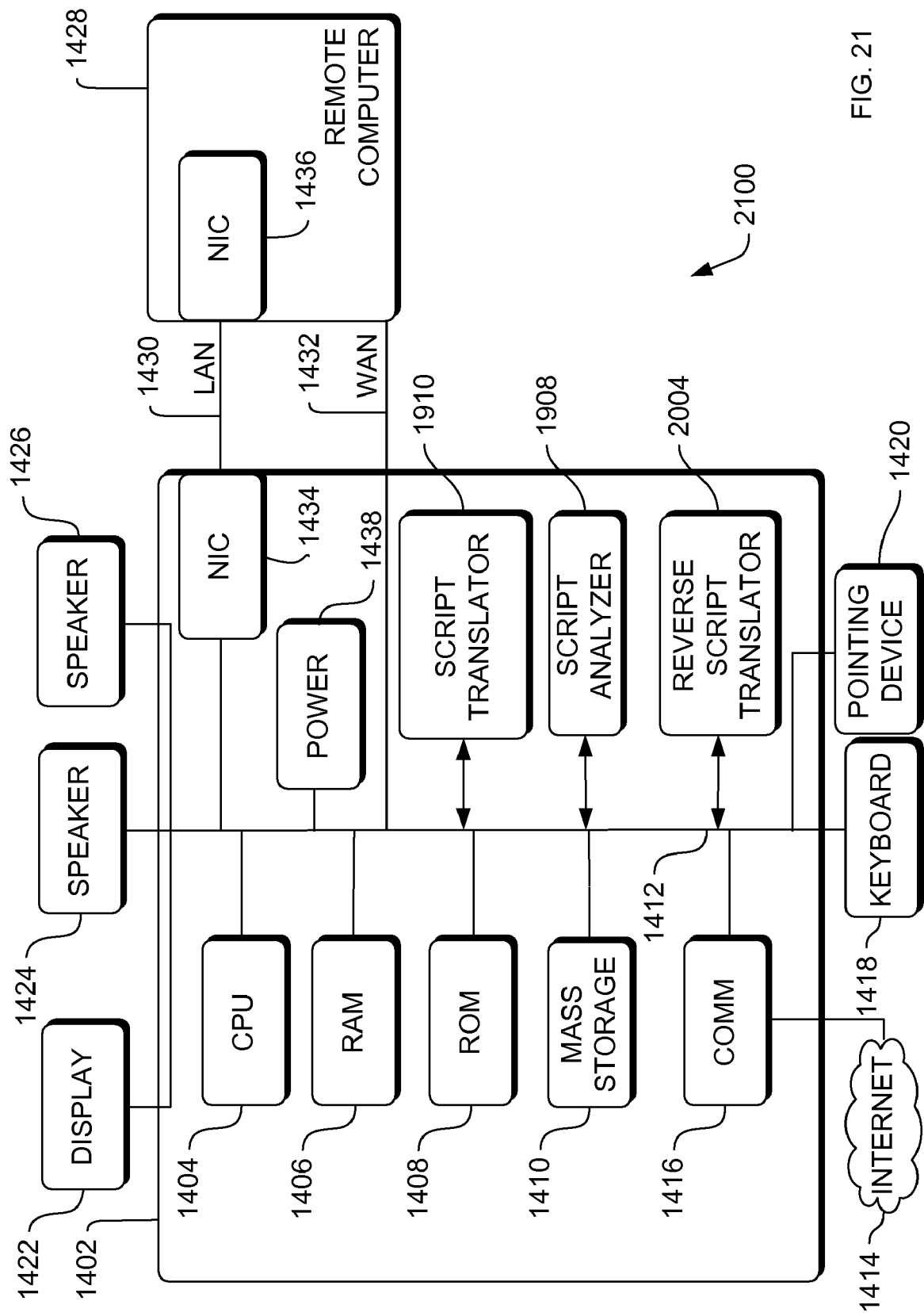
FIG. 21 is a block diagram of an environment similar to that of FIG. 14, but with the addition of some of the apparatus illustrated in FIG. 20.

Referring to FIGS. 20 and 21, a particular scripting language implementation 2000 is described in conjunction with the system overview in FIG. 19 and the methods described in conjunction with FIGS. 2-13.

FIG. 20 is a block diagram of a particular implementation of an apparatus to translate scenarios to a script and reverse engineer a script into a formal specification using an automata-learning generator, according to an embodiment. Apparatus 2000 can solve the need in the art for an automated, generally applicable way to verify that implemented scripts are a provably correct implementation of a scenario(s).

Apparatus 2000 may include one or more scenarios 102 and one or more automata learning resources 104 that are input to or received by an automata learning generator 106. The automata learning generator 106 can generate another set of one or more scenarios 108.

Apparatus 2000 can include a translator 1904 that generates a formal specification 1906 from the laws of concurrency 2002 and the scenario(s) 108 in reference to the optional inference engine 1902.

Subsequently, the formal specification 1906 may be translated by script translator 1910 into a script 1912 in some appropriate scripting language. In some embodiments, no manual intervention in the translation may be provided. Those skilled in the art will readily understand that other appropriate notations and/or languages exist that are within the scope of this invention.

In some embodiments, apparatus 2000 can include an analyzer 1908 to determine various properties of the formal specification, such as the existence of omissions, deadlock, livelock, and race conditions, as well as other conditions, in the formal specification 1906, although one skilled in the art will recognize that other additional properties can be determined by the analyzer 1908. The analyzer 1908 may solve the need in the prior art to reduce errors.

In some embodiments, a reverse script translator 2004 can receive the script 1912 and generate a formal specification. The output of the reverse script translator 2004 may be a different formal specification than formal specification 1906. There can be some small differences between the formal specification generated by reverse script translator 2004 and formal specification 1906, but the formal specifications generated by the reverse script translator 2004 can be substantially functionally equivalent to the formal specification 1906.

Apparatus 2000 can operate for a wide variety of languages and applications, and thus apparatus 2000 may be characterized as generally applicable. Such applications can include, without limitation, distributed software systems, sensor networks, robot operation, complex scripts for spacecraft integration and testing, and autonomous systems, but those skilled in the art will understand that other applications are contemplated.

Apparatus 2000 components such as the translator 1904, script translator 1910, the analyzer 1908, and the reverse script translator 2004 can be embodied as computer hardware circuitry or as a computer-readable program, or a combination of both, such as shown in FIG. 21. In another embodiment, apparatus 2000 can be implemented in an application service provider (ASP) system.

FIG. 21 is a block diagram of an environment 2100, similar to that of FIG. 14, but with the addition of the script translator 1910, the analyzer 1908 and the reverse script translator 2004 that correspond to some of apparatus 2000.

R2D2C Implementations

Figure 22:
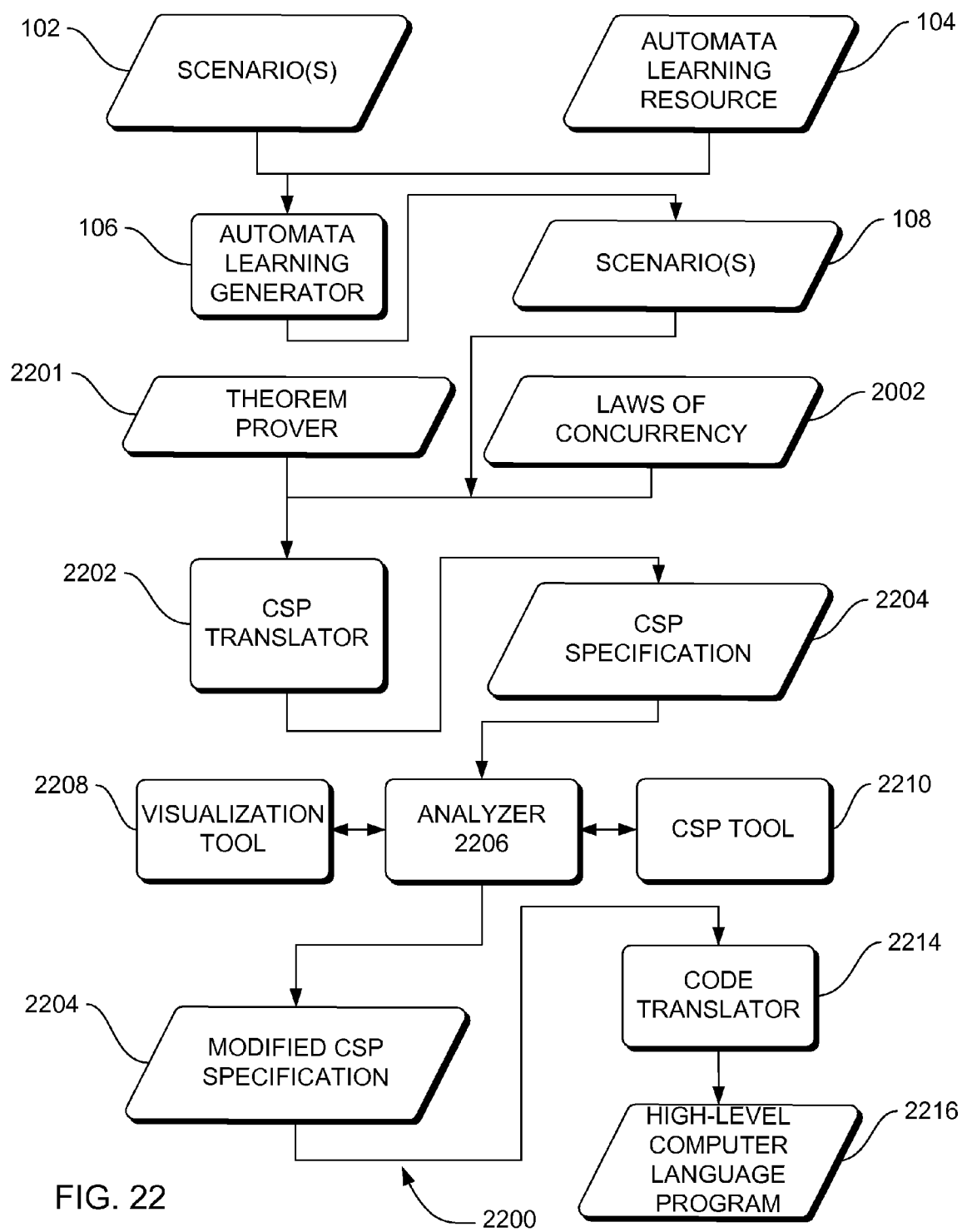
FIG. 22 is a block diagram of a particular R2D2C implementation of an apparatus to generate a high-level computer source code program from scenario(s), using an automata-learning generator, according to an embodiment.
Figure 23:
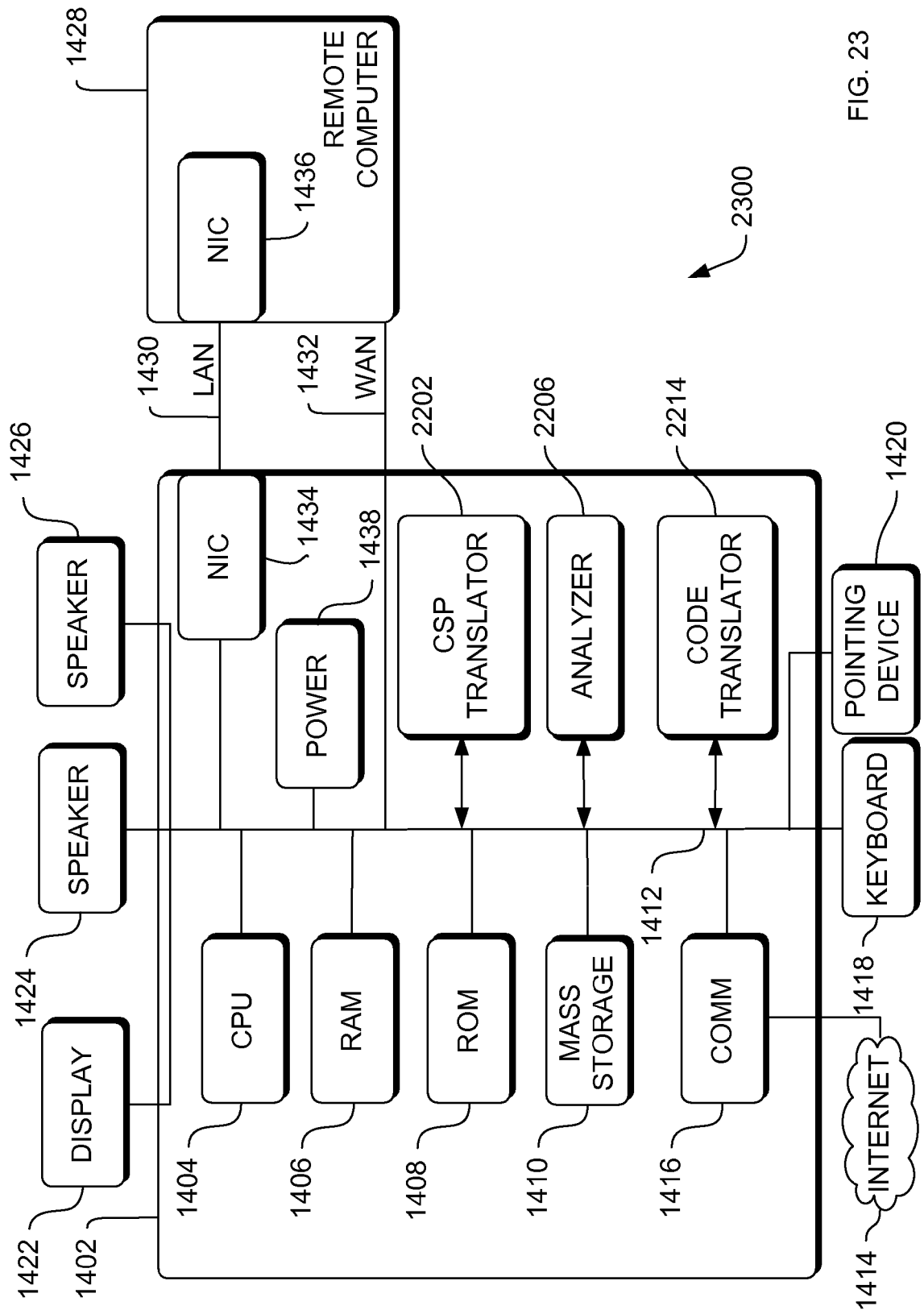
FIG. 23 is a block diagram of an environment similar to that of FIG. 14, but with the addition of some of the apparatus illustrated in FIG. 22.

FIGS. 22-23 describe particular R2D2C implementations. The R2D2C implementations may solve the need in the art to develop system at higher levels of abstraction. The R2D2C implementations can also convert the scenarios into a formal model or specification that can be analyzed for concurrency-related errors and consistency and completeness, as well as domain-specific errors.

The systems, method and apparatus described in FIGS. 22-23 may enhance the scenarios input to the R2D2C approach by using automata learning to generate other possible scenarios that can be used to make the set of scenarios more "complete." A more complete set of scenarios can result in a better formal model and enhance the results of the R2D2C process. The systems, method and apparatus described in FIGS. 22-23 can also be used with UML use cases to enhance the set of use cases that are used in specifying an application.

FIG. 22 is a block diagram of a particular R2D2C implementation of an apparatus 2200 to generate a high-level computer source code program from scenario(s) using an automata-learning generator, according to an embodiment. Apparatus 2200 may solve the need in the art for an automated, generally applicable means to produce a system that is a provably correct implementation of one or more policies.

One approach to requirements-based programming can be requirements-to-design-to-code (R2D2C), which provides a mathematically traceable round-trip engineering approach to system development. In R2D2C, engineers (or others) can write specifications as scenarios in constrained (domain-specific) natural language, or in a range of other notations (including UML use cases), which can be integrated to derive a formal model or specification that can be guaranteed to be equivalent to the requirements stated at the outset, and which will subsequently be used as a basis for code generation. The formal model can be expressed using a variety of formal methods such as CSP (Hoare's language of Communicating Sequential Processes). The R2D2C approach can generate a formal model with automatic reverse engineering.

R2D2C can be called unique in that the methodology allows for full formal development from the outset, and maintains mathematical soundness through all phases of the development process, from requirements through to automatic code generation. Method 2200 can also be used for reverse engineering, that is, in retrieving models and formal specifications from existing code. R2D2C can also be used to "paraphrase" (in natural language, etc.) formal descriptions of existing systems. This approach is not limited to generating high-level code. R2D2C can also be used to generate business processes and procedures, and to generate instructions for robotic devices, for example devices to be used on the Hubble Robotic Servicing Mission (HRSM). R2D2C can also be used as a basis for an expert system verification tool, and as a way of capturing domain knowledge for expert systems, and for generating policies from requirements.

The R2D2C approach can involve a number of phases. The following describes some of these phases. The process D1 thru D5 can illustrate the development approach which is suitable for various types of analysis and investigation, and serve as the basis for fully formal implementations as well as for use in automated test case generation, for example.

D1 Scenarios Capture: Engineers, end users, and others can write scenarios describing intended system operation. The input scenarios can be represented in a constrained natural language using a syntax-directed editor, or can be represented in other textual or graphical forms.

D2 Traces Generation: Traces and sequences of atomic events can be derived from the scenarios defined in phase D1.

D3 Model Inference: A formal model, or formal specification, expressed in CSP, can be inferred by an automatic theorem prover, in this case, using the traces derived in phase D2. A deep embedding of the laws of concurrency in the theorem prover can provide sufficient knowledge of concurrency and of CSP to perform the inference.

D4 Analysis: Based on the formal model, various analyses can be performed, using currently available commercial or public domain tools, and specialized tools that are planned for development. Because of the nature of CSP, the model can be analyzed at different levels of abstraction using a variety of possible implementation environments.

D5 Code Generation: The techniques of automatic code generation from a suitable model are reasonably well understood. The present modeling approach may be suitable for the application of existing code generation techniques, whether using a tool specifically developed for the purpose, or existing tools such as FDR, or converting to other notations suitable for code generation (e.g., converting CSP to B and then using the code generating capabilities of the B Toolkit).

In some embodiments, an exemplary system for automatic control of ground stations of overhead satellites may include both autonomous and autonomic properties and may operate by having a community of distributed autonomous software modules work cooperatively based on policies to perform the functions previously undertaken by human operators using traditional software tools, such as orbit generators and command sequence planners. In the following example, the Pager agent and a mapping from natural language descriptions through to the CSP model can be used to generate code.

Based on defined policies, the Pager agent can send pages to engineers and controllers when there is a spacecraft anomaly. For example, the Pager agent can receive requests from the user interface agent that no analyst is logged on, so the Pager agent can get paging information from the Database agent and can page an appropriate analyst, and, when instructed by the user interface agent, stops paging the analyst. These policies can be stated as follows:

When the Pager agent receives a request from the User Interface agent, the Pager agent can send a request to the Database agent for an analyst's pager information and put the message in a list of requests to the Database agent. When the Pager agent receives a pager number from the Database agent, then the Pager agent can remove the message from the paging queue, send a message to the analyst's pager and add the analyst to the list of paged people. When the Pager agent receives a message from the User Interface agent to stop paging a particular analyst, the Pager agent can send a stop-paging command to the analyst's pager and remove the analyst from the paged list. When the Pager agent receives another kind of message, a reply can be sent to the sender that the message was not recognized.

The above policies could then be translated into CSP. The following is a partial CSP description of the Pager agent:

```
PAGER_BUSdbwaiting,paged = pager. Iin?msg→
    case
        GET_USER_INFOdb_waiting,paged,pagee,text
            if msg = (STARTPAGING, specialist, text)
        BEGIN_PAGINGdb_waiting,paged,
            in_reply_to_id(msg),pager-num
            if msg = (RETURN_DATA,pager_num)
        STOP_CONTACTdb_waiting,paged,pagee
            if msg = (STOP_PAGING, pagee)
        pager.Iout!(head(msg), UNRECOGNIZED)
            →PAGER_BUSdb_waiting,paged
        otherwise
```

The above pseudo-language description states that the process PAGER_BUS receives a message on its "Iin" channel and stores the message in a variable called "msg". Depending on the contents of the message, one of four different processes can be executed based on the policies. If the message is of type START_PAGING, then the GET_USER_INFO process is called with parameters of the specialist to page (pagee) and the text to send. If the message is of type RETURN_DATA with a pagee's pager number, then the database has returned a pager number and the BEGIN_PAGING process is executed with a parameter containing the original message id (used as a key to the db-waiting set) and the passed pager number. The third type of message that the Pager agent might receive is one of type STOP_PAGING. This message contains a request to stop paging a particular specialist (stored in the pagee parameter). When this message is received, the STOP_PAGING process is executed with the parameter of the specialist type. If the Pager agent receives any other message than the above three messages, an error message is returned to the sender of the message (which is the first item of the list) stating that the message is "UNRECOGNIZED. After this, the PAGER_BUS process is again executed.

Some of the benefits of using R2D2C, and hence of using Formal Requirements-Based Programming in system development can include increasing assurance of system success by ensuring completeness and consistency of requirements, by ensuring that implementations are true to the requirements, by ensuring that automatically coded systems are bug-free; and by ensuring that implementation behavior is as expected. Another benefit may be decreased costs and schedule impacts of ultra-high dependability systems through automated development and yet another benefit may be decreased re-engineering costs and delays.

Apparatus 2200 may include one or more scenarios 102 and one or more automata learning resources 104 that are input to or received by an automata learning generator 106. The automata learning generator 106 may generate another set of one or more scenarios 108. Apparatus 2200 may also include a set of laws of concurrency 2002.

The scenario(s) 108, a set of laws of concurrency 2002 and data from a theorem prover 2201 may be received by a direct mechanical CSP translator 2202. The plurality of rules or requirements of the scenario(s) 108 may be translated mechanically to a CSP specification 2204 encoded in Hoare's language of Communicating Sequential Processes (CSP).

In some embodiments, the system may include a CSP specification analyzer 2206 to perform model verification/checking and determine existence of omissions, deadlock, livelock and race conditions in the CSP specification 2204. In some embodiments, the CSP specification analyzer 2206 can receive and transmit information from and to a visualization tool 2208 that provides a way to modify the CSP specification 2204. In some embodiments, the CSP specification analyzer 2206 may receive and transmit information from and to a tool 2210 designed for CSP that provides a way to modify the CSP specification 2204.

The CSP specification analyzer 2206 may generate a modified CSP specification 2204 that is in turn received by a code translator 2214 or compiler to translate the plurality of formal specification segments 306 to a set of instructions in a high-level computer language program 2216, such as Java language.

CSP specification analyzer 2206 may allow the user to manipulate the formal specification 2204 in various ways. The CSP specification analyzer 2206 can allow the user to examine the system described by the scenario(s) 108, and to manipulate it. The CSP specification 2204 can be analyzed to highlight undesirable behavior, such as race conditions, and to point out errors of omission in the scenario(s) 108. The CSP specification analyzer 2206 may be an optional but useful stage in the disclosed embodiments of the present invention. If the CSP specification analyzer 2206 is not used, then the formal specification 306 and the modified CSP specification 2204 may be identical. Hence, if the CSP specification analyzer 2206 is not used, then all references to the modified CSP specification 2204 disclosed below may also apply to the CSP specification 2204.

Apparatus 2200 may not include a requirements-completion component using temporal constraints. Alternatively, the CSP translator 2202 (also known as a model inference component) can be replaced by a requirements-completion component, in which case, the analyzer 2206 and the code translator 2214 can operate on the model produced by the requirements-completion component.

Apparatus 2200 may be operational for a wide variety of policy languages and applications, and thus apparatus 2200 may be characterized as generally applicable. Such applications may include distributed software systems, sensor networks, robot operation, complex scripts for spacecraft integration and testing, and autonomous systems.

Apparatus 2200 components of the direct mechanical CSP translator 2202, the CSP specification analyzer 2206, visualization tool 2208, CSP tool 2210 and the code translator 2214 can be embodied as computer hardware circuitry or as a computer-readable program, or a combination of both, such as shown in FIG. 22. In another embodiment, apparatus 2200 can be implemented in an application service provider (ASP) system.

FIG. 23 is a block diagram of an environment 2300 similar to that of FIG. 14, but with the addition of the CSP translator 2202, the CSP specification analyzer 2206 and the code translator 2214 that correspond to some of apparatus 2200, according to an embodiment.

The apparatus of FIG. 22 and 23 may be applicable to the development, maintenance, and verification of expert systems. In particular, the R2D2C methods and apparatus of FIG. 22 and FIG. 23 can verify an expert system used in the NASA ground control center for the POLAR spacecraft, which can perform multi-wavelength imaging of the Earth's aurora. The POLAR ground control expert system has rules written in the production system CLIPS for auto- mated "lights out" (untended) operation of the spacecraft. A suitable translator from CLIPS (rather than natural language) to CSP (or EzyCSP) supports examination of existing expert system rule bases for consistency and so forth. CLIPS rules can be generated from CSP (or EzyCSP), similar to generating code in Java or C++, which can provide a way of capturing expert knowledge, from natural language description through to CLIPS rules, while maintaining correctness.

The "code" generated by the systems, methods and procedures described herein, particularly in FIG. 22 and FIG. 23 may not be specifically coded in a programming language. In some embodiments, the systems, methods and procedures herein can determine validity and correctness of procedures for complex robotic assembly or repair tasks in space. More specifically, the systems, methods and procedures described herein can provide an additional way to validate procedures from the Hubble Robotic Servicing Mission (HRSM), for example, the procedures for replacement of cameras on the Hubble Space Telescope (HST).

The systems, methods and procedures described herein may be effective in test- based discovery of models of legacy-communication systems. The tractability of observation based model generation can be achieved through optimizations exploiting different kinds of expert knowledge in order to drastically reduce the number of required queries, and thus the testing effort. A thorough experimental analysis of the second-order effects between such optimizations can maximize combined impact, and may provide development of a mature toolset for experimentation. The systems, methods and procedures described herein can be coherent with the usual notions of conformance testing. In the specific R2D2C context, the systems, methods and procedures described herein can be applied to the combined approach to the specification of communication mechanisms on sensor networks, expert systems and robotic operations.

Pattern-Matching Implementations

Figure 24:
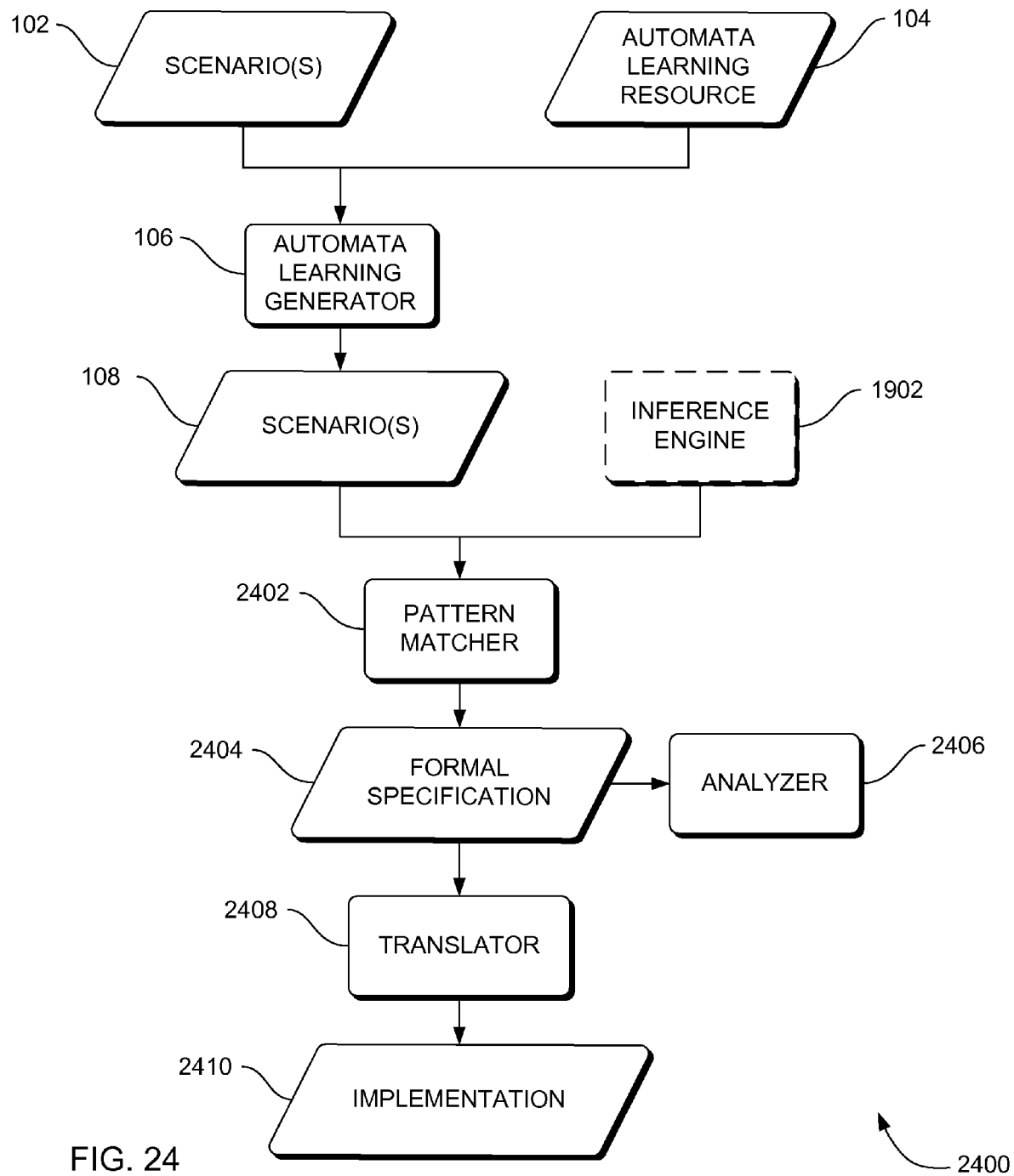
FIG. 24 is a block diagram that provides an overview of an apparatus to engineer an implementation from scenarios using an automata-learning generator, according to an embodiment.
Figure 25:
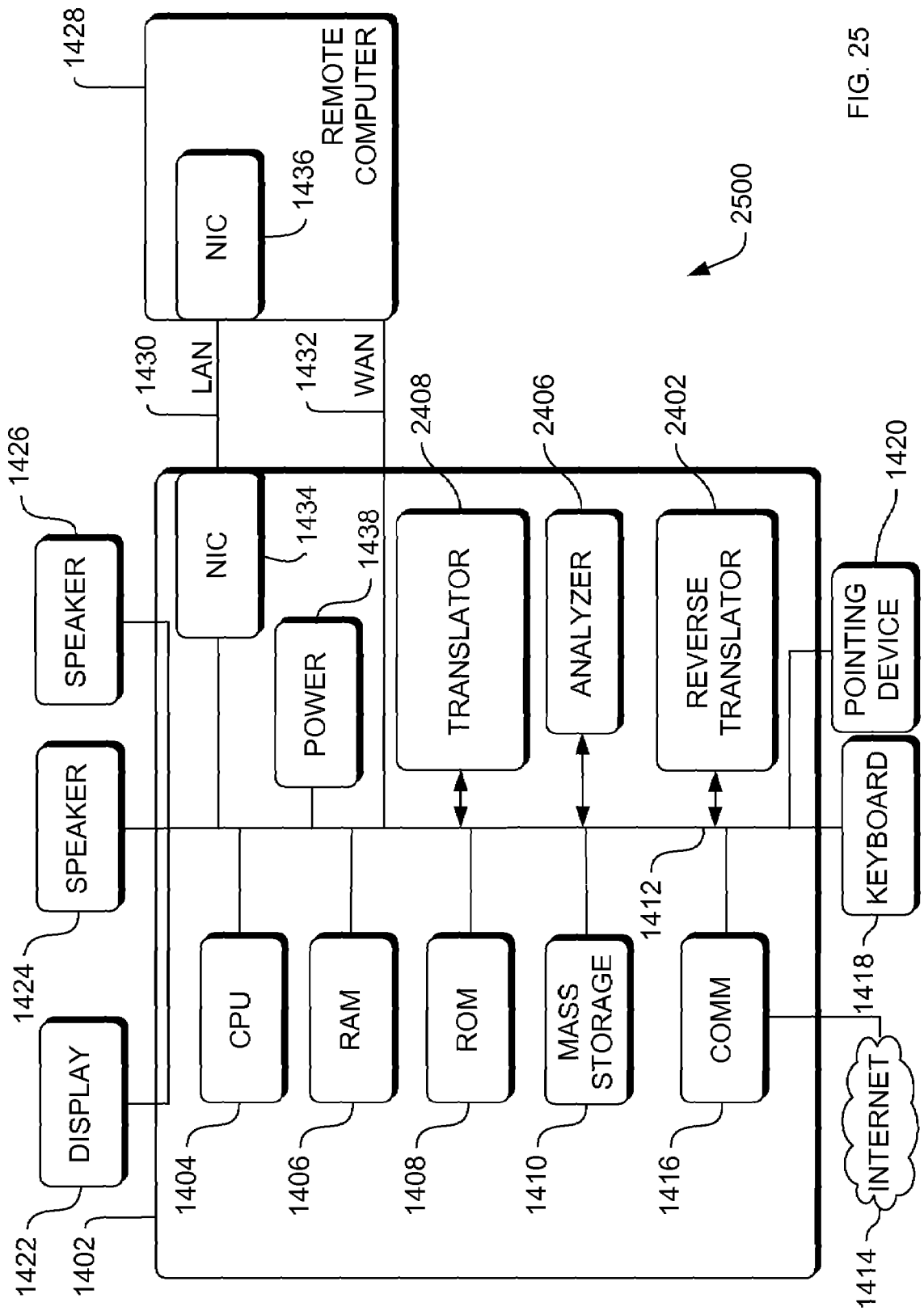
FIG. 25 is a block diagram of an environment similar to that of FIG. 14, but with the addition of some of the apparatus illustrated in FIG. 24.

Referring to FIGS. 24 and 25, a particular pattern-matching embodiment 2400 is described in conjunction with the system overview in FIG. 1 and the methods described in conjunction with FIGS. 2-13.

FIG. 24 is a block diagram that provides an overview of an apparatus 2400 to engineer an implementation from scenarios using an automata-learning generator, according to an embodiment. Apparatus 2400 may reduce system development time, reduce the amount of testing required of a new system, and improve confidence that the system reflects the requirements.

One embodiment of the apparatus 2400 may be a software development system that can include a data flow and processing points for the data. According to the disclosed embodiments, apparatus 2400 can convert scenarios into an implementation on which model checking and other mathematics-based verifications can then be performed.

Apparatus 2400 may include one or more scenarios 102 and one or more automata learning resources 104 that are input to or received by an automata learning generator 106. The automata learning generator 106 can generate another set of one or more scenarios 108.

In one embodiment, the scenarios 108 may be received by a pattern matcher 2402. The optional inference engine 1902 might be referenced by the pattern matcher 2402 when the scenarios 108 are translated by the pattern matcher 2402 into a formal specification 2404. Subsequently, the formal specification 2404 may be translated by a translator 2408 into an implementation 2410 in some appropriate scripting language or other implementation language. In some embodiments, no manual intervention in the translation may be provided; thus, apparatus 2400 can improve confidence that the systems reflects the requirements which in turn can reduce the amount of testing required of a new system and can reduce system development time. Those skilled in the art will readily understand that other appropriate notations and/or languages exist that are within the scope of this invention.

In some embodiments, apparatus 2400 can include an analyzer 2406 to determine various properties of the formal specification, such as the existence of omissions, deadlock, livelock, and race conditions, as well as other conditions, in the formal specification 2404, although one skilled in the art will recognize that other additional properties can be determined by the analyzer 2406. The analyzer 2406 may solve the need in the prior art to reduce errors.

In some embodiments, the implementation 2410 can be mathematically and provably equivalent to the scenarios 108. Mathematically equivalent does not necessarily mean mathematically equal. Mathematical equivalence of A and B means that A implies B and B implies A. Note that the implementation 2410 of some embodiments may be mathematically equivalent to, rather than necessarily equal to, the scenarios 108.

In some embodiments, the formal specification 2404 can be a process-based specification, such as process algebra encoded notation. The process algebra encoded notation can be a mathematically notated form. This embodiment can satisfy the need in the art for an automated, mathematics-based process for requirements validation that does not require large computational facilities.

In some embodiments, the scenarios 108 of apparatus 2400 can specify allowed situations, events and/or results of a software system. In that sense, the scenarios 108 can provide a very abstract specification of the software system.

Some embodiments of apparatus 2400 can be operational for a wide variety of rules, computer instructions, computer languages and applications; thus, apparatus 2400 may be characterized as generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the apparatus 2400 can provide mechanical or automatic generation of the implementation 2410, in which human intervention is not required. In at least one embodiment of the apparatus 2400, updating the generated application can be accomplished by making a change in the scenarios 108, in which case the changes and validation can ripple through the entire system without human intervention when apparatus 2400 operates. This may also allow the possibility of cost effectively developing competing designs for a product and implementing each to determine the best one.

Thus, in regards to implementations, automatic code generation of apparatus 2400 can generate an implementation in suitable scripting language or device control language (such as for a robot) that would provide the procedures, once validated, to be automatically transformed into an implementation. Additionally, apparatus 2400 can be used to "reverse engineer" existing implementation so that the implementation can be analyzed and corrected and recast in a format and form that can be more easily understood. Apparatus 2400 also can be used to reverse engineer multiple existing implementations (even written in different languages) to a single formal model by which the implementations are combined, analyzed for conflicts, and regenerated as a single implementation (in the same or a different procedure/scripting language).

Some embodiments of apparatus 2400 may operate in a multi-processing, multi-threaded operating environment on a computer, such as the computer 1402 illustrated in FIG. 14. While the apparatus 2400 may not be limited to any particular scenarios 108, inference engine 1902, pattern matcher 2402, formal specification 2404, analyzer 2406, translator 2408 and implementation 2410, for sake of clarity, embodiments of simplified scenarios 108, inference engine 1902, pattern matcher 2402, formal specification 2404, analyzer 2406, translator 2408 and an implementation 2410 are described.

In some embodiments, the apparatus 2400 may be a software development system that can include a data flow and processing points for the data. Apparatus 2400 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, apparatus 2400 can, without human intervention, convert different types of specifications (such as natural language scenarios or descriptions which are effectively pre-processed scenarios) into a formal specification on which model checking and other mathematics-based verifications are performed, and then optionally translate the formal specification into code or other implementation.

Apparatus 2400 can be operational for a wide variety of languages for expressing requirements; thus, apparatus 2400 may be characterized as generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

Apparatus 2400 components such as the pattern matcher 206, translator 2008, the analyzer 2006, and the reverse translator 2402 can be embodied as computer hardware circuitry or as a computer-readable program, or a combination of both, such as shown in FIG. 25. In another embodiment, apparatus 2400 can be implemented in an application service provider (ASP) system.

FIG. 25 is a block diagram of an environment 2500 similar to that of FIG. 14, but with the addition of the translator 2408, the analyzer 2406 and the reverse translator 2402 that correspond to some of apparatus 2400.

R2D2C Pattern-Matching Implementations

Figure 26:
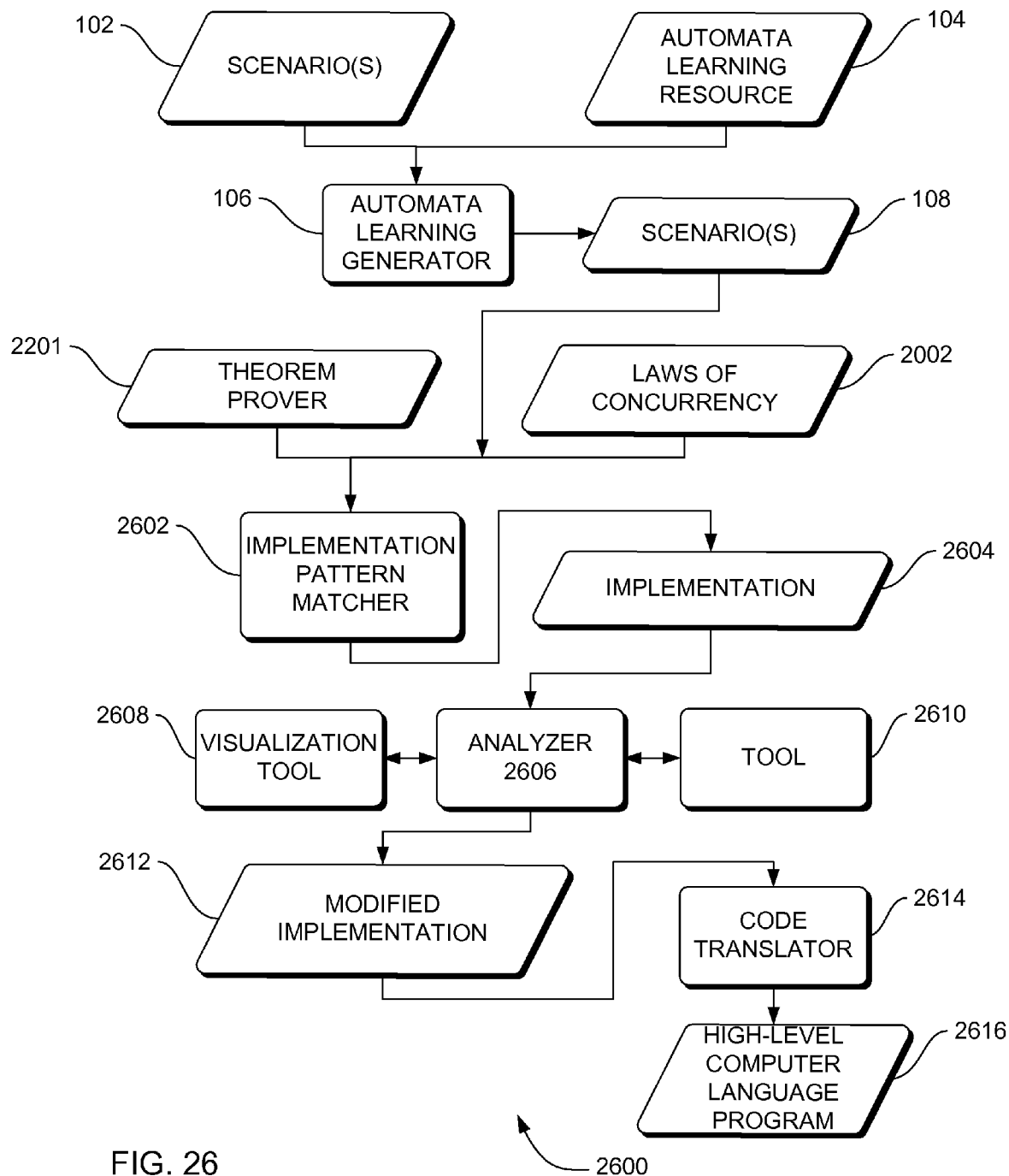
FIG. 26 is a block diagram of an apparatus to generate a high-level computer source code program from scenario(s) using pattern-matching and R2D2C, according to an embodiment, using an automata-learning generator.

Referring to FIG. 26, a particular apparatus 2600 is described in conjunction with the system overview in FIG. 1.

FIG. 26 is a block diagram of a particular embodiment of an apparatus 2600 to generate a high-level computer source code program from scenario(s) using pattern-matching and R2D2C using an automata-learning generator, according to an embodiment. Apparatus 2600 may solve the need in the art for an automated, generally applicable way to produce a system that is a provably correct implementation of a scenario 108.

Apparatus 2600 may include one or more scenarios 102 and one or more automata learning resources 104 that are input to or received by an automata learning generator 106. The automata learning generator 106 may generate another set of one or more scenarios 108.

The scenario(s) 108, a set of laws of concurrency 2002 and data from a theorem prover 2201 can be received by a direct mechanical implementation pattern matcher 2602. The scenario(s) 108 may be translated mechanically to an implementation 2604.

In some embodiments, the system may include an implementation analyzer 2606 to perform model verification/ checking and determine existence of omissions, deadlock, livelock and race conditions in the implementation 2604. In some embodiments, the implementation analyzer 2606 can receive and transmit information from and to a visualization tool 2608 that may provide a way to modify the implementation 2604. In some embodiments, the implementation analyzer 2606 can receive and transmits information from and to a tool 2610 that may provide a way to modify the implementation 2604.

The implementation analyzer 2606 may generate a modified implementation 2612 that is in turn received by a code translator 2614 or compiler to translate the plurality of process-based specification segments 108 to a set of instructions in a high-level computer language program 2616, such as Java language.

The implementation analyzer 2606 may allow the user to manipulate the implementation 2604 in various ways. The implementation analyzer 2606 may allow the user to examine the system described by the scenario(s) 102 and 108, and to manipulate it. The implementation 2604 can be analyzed to highlight undesirable behavior, such as race conditions, and to point out errors of omission in the scenario(s) 108. The implementation analyzer 2606 can be an optional but useful stage in the disclosed embodiments of the present invention. If the implementation analyzer 2606 is not used, then the process-based specification 160 and the modified implementation 2612 can be identical. Hence, if the implementation analyzer 2606 is not used, then all references to the modified implementation 2612 disclosed below may also apply to the implementation 2604.

Apparatus 2600 is operational for a wide variety of scenario(s) 108 languages and applications; thus, apparatus 2600 may be characterized as generally applicable. Such applications may include distributed software systems, sensor networks, robot operation, complex scripts for spacecraft integration and testing, and autonomous systems.

Apparatus 2600 components of the direct mechanical implementation pattern matcher 2602, the implementation analyzer 2606, visualization tool 2608, tool 2610 and the code translator 2614 can be embodied as computer hardware circuitry or as a computer-readable program, or a combination of both, such as shown in FIG. 26. In another embodiment, apparatus 2600 may be implemented in an application service provider (ASP) system.

Figure 27:
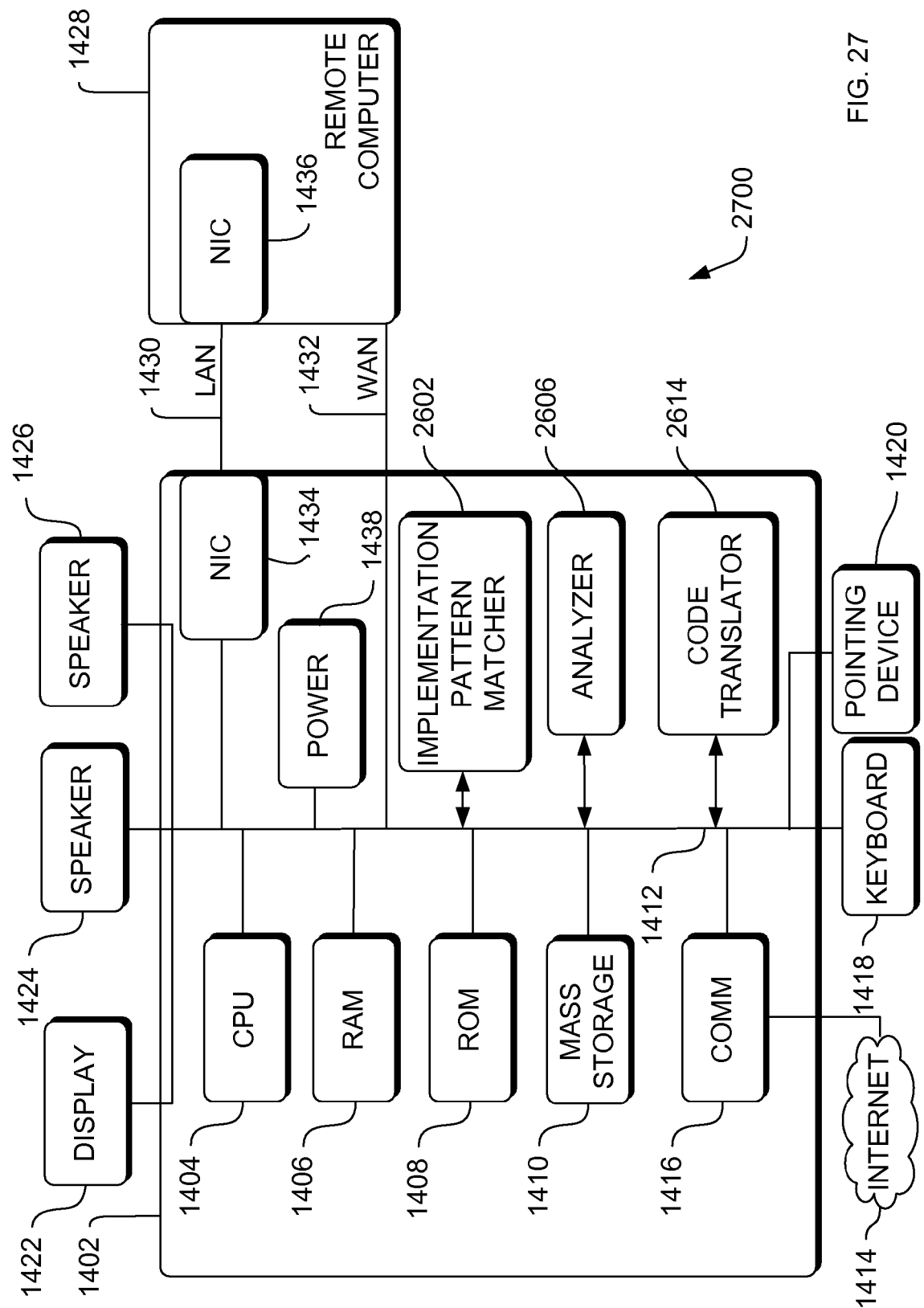
FIG. 27 is a block diagram of a hardware and operating environment in which a pattern-matching R2D2C implementation illustrated in FIG. 26 is implemented, according to an embodiment.

FIG. 27 is a block diagram of a hardware and operating environment in which a particular pattern-matching R2D2C implementation of FIG. 26 is implemented, according to an embodiment.

In still further embodiments, four optimizations may limit the number of required user interactions, such as optimization of user-given safety specification.

In computer-readable program embodiments, the programs can be structured in an object-orientation using an object-oriented language such as Java, Smalltalk or C++, and the programs can be structured in a procedural-orientation using a procedural language such as COBOL or C. The software components may communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 1402 in FIG. 14, or on at least as many computers as there are components.

CONCLUSION

Systems, methods and apparatus are provided through which in some embodiments, automata learning algorithms and techniques may be implemented to generate a more complete set of scenarios for requirements based programming.

In some embodiments, a CSP-based, syntax-oriented model construction, which requires the support of a theorem prover, may be complemented by model extrapolation, via automata learning. This embodiment can support the systematic completion of the requirements, the nature of the requirement being partial, which can provide focus on the most prominent scenarios. This embodiment may generalize requirement skeletons by extrapolation and indicate by use of automatically generated traces where the requirement specification is too loose and additional information is required.

In some embodiments, a R2D2C process may be implemented to mechanically transform system requirements via provably equivalent models to executable computer code. In further embodiments, a CSP-based, syntax-oriented model construction of the R2D2C method may be complemented with a learning-based method to provide requirements completion. Automatic (active) automata learning can systematically enrich requirement specifications posed in terms of traces.

Systems, methods and apparatus described herein may have many commercial applications such as the following: (1) Business procedures, in a variety of domains, can be analyzed, evaluated, improved, combined, verified, and automatically implemented in a programming language. (2) Formal modes can have been proposed for analyzing legal contracts. However, legal experts are not likely to have the required skills to develop such mathematical models. This approach can enable legal contracts to be converted automatically to a formal model and analyzed. (3) Procedures for assembling (or disassembling) components in a factory, in space, or elsewhere, whether performed by robots or humans, are prone to error and "trial and error"; the approach disclosed herein may eliminate the uncertainty and ensure that procedures are correct. (4) There are a large number of implementations in the public domain, in particular in communications networks and the bioinformatics industry; similarly NASA (and other organizations) may have many existing implementations used for space mission test and integration. Most of these implementations have little or no documentation, meaning that the implementations cannot be used except by explanations of the implementations, and hence reuse of the implementations. (5) Existing implementations can be combined using this approach, and can be checked for incompatibilities, etc. Then a single implementation can be generated to combine the functionality of several implementations. This may have major ramifications for bioinformatics, robotic assembly and maintenance, integration and test, and other domains.

We claim:

1. A computer-accessible medium having executable instructions to generate a system, the executable instructions capable of directing a processor to perform:
   generating at least one scenario that describes requirements of the system in reference to automata-learning resources, automata-learning resources being a system interface that maps functions and structures the learning process; and
   generating at least one implementation from the at least one scenario,
   such that the processor derives a system reflecting requirement specifications thereby reducing system development time.

2. The computer-accessible medium of claim 1, wherein the instructions includes instructions capable of directing a processor to perform:
   generating at least one scenario in a recursive heuristic manner, the at least one scenario describing requirements of the system to using automata-learning resources.

3. The computer-accessible medium of claim 1, wherein the instructions includes instructions capable of directing a processor to perform:
   pattern-matching the at least one scenario of the system to at least one process-based specification segment.

4. The computer-accessible medium of claim 3, wherein the instructions includes instructions capable of directing a processor to perform:
   pattern-matching the at least one scenario of the system to a formal specification using an inference engine, the inference engine iteratively applying a set of rules to a set of data representing a problem to determine a solution to the problem by logical manipulation and analysis of the data.

5. The computer-accessible medium of claim 4, the medium further comprising executable instructions capable of directing the processor to perform:
   analyzing the formal specification, whereby analyzing includes identifying at least one equivalent alternative process-based specification and characterizing differences between the process-based specification and the at least one alternative process-based specification, wherein differences include the number of process, deterministic behavior, and competition for resources.

6. The computer-accessible medium of claim 5, wherein the instructions includes instructions capable of directing a processor to perform:
   applying mathematical logic to the formal specification in order to identify a presence or absence of mathematical properties of the scenario, wherein mathematical logic operates through the instructions to reveal where prescribed mathematical properties exist in the formal specification of the scenario.

7. The computer-accessible medium of claim 6, the medium further comprising executable instructions capable of directing the processor to perform:
   correcting the absence of the mathematical properties if the mathematical properties are identified as absent in the scenario.

8. The computer-accessible medium of claim 7, wherein the mathematical properties of the formal specification include
   whether the formal specification implies a system execution trace that includes a deadlock condition, wherein a deadlock condition is a condition in which two executing processes each wait for the other to finish;
   whether the formal specification implies a system execution trace that includes a livelock condition, wherein a livelock condition is a condition in which two executing processes each wait for the other to finish, as their relative internal states change continually during execution without progress being made by either process; and
   whether the format specification implies a system execution trace that exhibits or does not exhibit a plurality of other behaviors,
   wherein a trace is a sequence of actions expressed as strings representing a history of an execution of a process.

9. The computer-accessible medium of claim 4, wherein the formal specification includes
   a process algebra, wherein the process algebra is a member of a diverse family of related approaches to formally modeling concurrent systems that provide a tool for the high-level description of interactions, communications, and synchronizations between a collection of independent agents or processes, along with algebraic laws that allow process descriptions to be manipulated and analyzed, and permit formal reasoning about equivalences between processes.

10. The computer-accessible medium of claim 9, wherein the process algebra includes:
    a language of Communicating Sequential Processes, wherein Communicating Sequential Processes is a formal language for describing patterns of interaction in concurrent systems.

11. The computer-accessible medium of claim 1, wherein the instructions include instructions capable of directing a processor to perform:
    translating the at least one scenario of the system to a script, wherein the system instructions automatically transform the learned models into logically equivalent scripts while preserving the full semantics, wherein the scripts have the properties of the learned models.

12. The computer-accessible medium of claim 11, wherein the instructions include instructions capable of directing a processor to perform:
    translating the at least one scenario of the system to a script, without the use of an automated inference engine.

13. The computer-accessible medium of claim 11, wherein the instructions further comprise instructions capable of directing a processor to perform:

translating the at least one scenario of the system to a script using an inference engine.

14. The computer-accessible medium of claim 11, wherein the instructions include instructions capable of directing a processor to perform:

translating the at least one scenario of the system to a formal specification using an inference engine; and translating the formal specification to the script.

15. The computer-accessible medium of claim 11, the medium further comprising executable instructions capable of directing the processor to perform:

analyzing the formal specification, whereby analyzing includes identifying at least one equivalent alternative process-based specification and characterizing differences between the process-based specification and the at least one alternative process-based specification, wherein differences include the number of processes, deterministic behavior, and competition for resources.

16. The computer-accessible medium of claim 15, wherein the instructions include instructions capable of directing a processor to perform:

applying mathematical logic to the format specification in order to identify a presence or absence of mathematical properties of the scenario, wherein mathematical logic operates through the instructions to reveal where prescribed mathematical properties exist in the formal specification of the scenario.

17. The computer-accessible medium of claim 16, the medium further comprising executable instructions capable of directing the processor to perform:

correcting the absence of the mathematical properties if the mathematical properties are identified as absent in the scenario, wherein the learning process incorporates information about the absence of behavior in the constructed models.

18. The computer-accessible medium of claim 16, wherein the mathematical properties of the script include:

whether the script implies a system execution trace that includes a deadlock condition, wherein a deadlock condition is a condition in which two executing processes each wait for the other to finish;

whether the script implies a system execution trace that includes a livelock condition, wherein a livelock condition is a condition in which two executing processes each wait for the other to finish, as their relative internal states change continually during execution without progress being made by either process; and whether the script implies a system execution trace that exhibits or does not exhibit a plurality of other behaviors, wherein a trace is a sequence of actions expressed as strings representing a history of an execution of a process.

19. The computer-accessible medium of claim 11, wherein the script includes:

a script encoded in PERL language.

20. The computer-accessible medium of claim 11, wherein the script includes:

a script encoded in BIOPERL language.

21. The computer-accessible medium of claim 11, wherein the script includes:

a script encoded in PYTHON language.

22. The computer-accessible medium of claim 11, wherein the script includes:

a script encoded in awk language.

23. The computer-accessible medium of claim 11, the medium further comprising executable instructions capable of directing the processor to perform:

translating the script to a formal model, wherein translating the script to a formal model includes using correctness preserving transformations of the scripts or an inference engine; and translating the formal model to at least one scenario, wherein the formal model is used to extract one or more scenarios by applying the Laws of Concurrency.

24. A computer-accessible medium having executable instructions to generate a system from scenarios, the executable instructions capable of directing a processor to perform:

generating a plurality of substantially complete scenarios from a plurality of less than substantially complete scenarios using automata learning processes;

pattern-matching the plurality of substantially complete scenarios to a formal specification, whereby pattern-matching includes checking for the presence of the constituents of a given pattern to test whether things have desired structure, to find relevant structure, to retrieve aligning parts, or to substitute a matching part; and translating the formal specification to a process-based specification implementing the system, such that the processor generates a system without knowledge of scenarios and without human intervention.

25. The computer-accessible medium of claim 24, wherein the instructions include instructions capable of directing a processor to perform:

verifying the syntax of the scenarios; and mapping the plurality of substantially complete scenarios to a plurality of formal specification segments.

26. The computer-accessible medium of claim 24, wherein the instructions include instructions capable of directing a processor to perform:

verifying consistency of the format specification.

27. The computer-accessible medium of claim 24, the medium further comprising executable instructions capable of directing the processor to perform:

analyzing the formal specification, whereby analyzing includes identifying at least one equivalent alternative process-based specification and characterizing differences between the process-based specification and the at least one alternative process-based specification, wherein differences include the number of processes, deterministic behavior, and competition for resources.

28. The computer-accessible medium of claim 24, the medium further comprising executable instructions capable of directing the processor to perform:

determining mathematical and logical properties of the format specification by an automated inference engine, wherein the inference engine iteratively applies a set of rules to a set of data representing a problem to determine a solution to the problem by logical manipulation and analysis of the data.

29. The computer-accessible medium of claim 24, wherein the instructions include instructions capable of directing a processor to perform:

pattern-matching the plurality of substantially complete scenarios to a separate formal specification without the use of an automated inference engine, whereby pattern-matching includes checking for the presence of the constituents of a given pattern to test whether things have desired structure, to find relevant structure, to retrieve aligning parts or to substitute a matching part.

30. The computer-accessible medium of claim 24, wherein the format specification includes:

a process algebra, wherein the process algebra is a member of a diverse family of related approaches to formally modeling concurrent systems that provide a tool for the high-level description of interactions, communications, and synchronizations between a collection of independent agents processes, along with algebraic laws that allow process descriptions to be manipulated and analyzed, and permit formal reasoning about equivalences between processes.

31. The computer-accessible medium of claim 30, wherein the process algebra includes:
a language of Communicating Sequential Processes, wherein Communicating Sequential Processes is a formal language for describing patterns of interaction in concurrent systems.

32. A computer-accessible medium having executable instructions to validate a system, the executable instructions capable of directing a processor to perform:
generating a plurality of substantially complete scenarios from a plurality of less than substantially complete scenarios using automata learning processes; and
pattern-matching the scenarios to a formal model, whereby pattern-matching includes checking for the presence of the constituents of a given pattern to test whether things have desired structure, to find relevant structure, to retrieve aligning parts, or to substitute a matching part,
such that the processor validates the system.

33. The computer-accessible medium of claim 32, the medium further comprising executable instructions capable of directing the processor to perform:
analyzing the formal model.

34. The computer-accessible medium of claim 33, wherein the instructions include instructions capable of directing a processor to perform:
applying mathematical logic to the formal model in order to identify a presence or absence of mathematical properties of the formal model.

35. The computer-accessible medium of claim 34, wherein the mathematical properties of the formal model include
whether the formal model implies a system execution trace that includes a deadlock condition, wherein a deadlock condition is a condition in which two executing processes each wait for the other to finish;
whether the formal model implies a system execution trace that includes a livelock condition, wherein a livelock condition is a condition in which two executing processes each wait for the other to finish, as their relative internal states change continually during execution without progress being made by either process; and
whether the formal model implies a system execution trace that exhibits or does not exhibit a plurality of other behaviors,
wherein a trace is a sequence of actions expressed as strings representing a history of an execution of a process.

36. The computer-accessible medium of claim 34, wherein the formal model includes:
a process algebra, wherein the process algebra is a member of a diverse family of related approaches to formally modeling concurrent systems that provide a tool for the high-level description of interactions, communications, and synchronizations between a collection of independent agents or processes, along with algebraic laws that allow process descriptions to be manipulated and analyzed, and permit formal reasoning about equivalences between processes.

37. A method of generating a system from requirements using automata learning techniques, the method comprising:

generating at least one scenario that describes requirements of the system;
optionally generating at least one additional scenario using automata learning resources, automata-learning resources being a system interface that maps functions and structures the learning process; and
generating at least one implementation from the at least one scenario by pattern matching with set comprehensions without a theorem prover, whereby pattern-matching includes checking for the presence of the constituents of a given pattern to test whether things have desired structure, to find relevant structure, to retrieve aligning parts, or to substitute a matching part.

38. The method of generating a system of claim 37, the method further comprising:
pattern matching the at least one scenario to at least one process-based specification segment, whereby pattern-matching includes checking for the presence of the constituents of a given pattern to test whether things have desired structure, to find relevant structure, to retrieve aligning parts, or to substitute a matching part.

39. The method of generating a system of claim 37, the method further comprising:
pattern matching the at least one scenario to a formal specification, in reference to an inference engine, whereby pattern-matching includes checking for the presence of the constituents of a given pattern to test whether things have desired structure, to find relevant structure, to retrieve aligning parts, or to substitute a matching part.

40. The method of generating a system of claim 39, the method further comprising:
analyzing the formal specification for flaws, whereby analyzing includes identifying at least one equivalent alternative process-based specification and characterizing differences between the process-based specification and the at least one alternative process-based specification, wherein differences include the number of process, deterministic behavior, and competition for resources; and
correcting any flaws in the formal specification.

41. The method of generating a system of claim 40, the method further comprising:
translating the formal specification into a plurality of scripts; and
generating a single script from the plurality of scripts.

42. The method of generating a system of claim 37, the method further comprising:
mechanically translating domain knowledge into format specification segments, wherein domain knowledge is formalized according to standards for expressing, the standards for expressing including the standard for expressing independence of action, the standard for expressing precedence, the standard for expressing causality, the standard for expressing concurrency, and the standard for expressing similarity.

43. A method of generating a software system, the method comprising:
generating at least one scenario using automata learning resources, automata-learning resources being a system interface that maps functions and structures the learning process;
translating domain knowledge into a plurality of formal specification segments, wherein domain knowledge is formalized according to standards for expressing, the standards for expressing including the standard for expressing independence of action, the standard for expressing precedence, the standard for expressing causality, the standard for expressing concurrency, and the standard for expressing similarity;

aggregating the formal specification segments into a single formal specification;

translating the single formal specification into at least one script; and generating a single script from the at least one script.

44. The method of generating a software system of claim 43, wherein translating domain knowledge into a plurality of formal specification segments is accomplished without human intervention and includes:

verifying the syntax of the at least one scenario;

mapping the at least one scenario into a format specification;

verifying the consistency of the format specification; and verifying a tack of other problems.

* * * * *